US010162072B2

(12) United States Patent
van Groenestijn

(10) Patent No.: US 10,162,072 B2
(45) Date of Patent: Dec. 25, 2018

(54) MARINE SURVEYS CONDUCTED WITH MULTIPLE SOURCE ARRAYS

(71) Applicant: PGS Geophysical AS, Oslo (NO)

(72) Inventor: Gert-Jan Adriaan van Groenestijn, Rijswijk (NL)

(73) Assignee: PGS Geophysical AS, Oslo (NO)

( * ) Notice: Subject to any disclaimer, the term of this patent is extended or adjusted under 35 U.S.C. 154(b) by 133 days.

(21) Appl. No.: 15/256,028

(22) Filed: Sep. 2, 2016

(65) Prior Publication Data

US 2017/0115419 A1     Apr. 27, 2017

Related U.S. Application Data

(60) Provisional application No. 62/246,283, filed on Oct. 26, 2015.

(51) Int. Cl.
*G01V 1/38* (2006.01)
*G01V 1/32* (2006.01)
*G01V 1/36* (2006.01)

(52) U.S. Cl.
CPC .............. *G01V 1/3808* (2013.01); *G01V 1/32* (2013.01); *G01V 1/3861* (2013.01); *G01V 1/36* (2013.01); *G01V 2210/121* (2013.01); *G01V 2210/1293* (2013.01); *G01V 2210/1423* (2013.01); *G01V 2210/56* (2013.01)

(58) Field of Classification Search
CPC ...... G01V 1/3861; G01V 1/3808; G01V 1/38; G01V 1/006; G01V 1/005; G01V 1/36; G01V 2210/56
USPC ..................................... 367/23; 181/110, 111
See application file for complete search history.

(56) References Cited

U.S. PATENT DOCUMENTS

| 4,254,480 A * | 3/1981 | French | G01V 1/20 367/22 |
| 4,314,364 A * | 2/1982 | Bickel | G01V 1/005 367/43 |
| 4,493,061 A * | 1/1985 | Ray | G01V 1/006 181/111 |
| 4,796,238 A * | 1/1989 | Bourgeois | G01V 1/306 367/87 |
| 4,894,809 A | 1/1990 | Moeckel | |

(Continued)

FOREIGN PATENT DOCUMENTS

| GB | 2360358 A | 9/2001 |
| GB | 2384053 A | 7/2003 |

(Continued)

OTHER PUBLICATIONS

GB Search Report under Section 17, Date of Search Apr. 11, 2017.

(Continued)

*Primary Examiner* — Ian J Lobo

(57) ABSTRACT

Marine surveys carried out with multiple source arrays comprising three or more sources are discussed. Each source of a multiple source array is an array of source elements, such as air guns. The sources of a multiple source array may be arranged in particular type of configuration that is effectively maintained while the survey vessel travels a sail line. The sources of the multiple source array are activated to acoustically illuminate a subterranean formation with acoustic signals. Two or more sources of a multiple source array may be activated to create blended seismic data.

13 Claims, 30 Drawing Sheets

(56) References Cited

U.S. PATENT DOCUMENTS

| | | | | |
|---|---|---|---|---|
| 2008/0312878 A1* | 12/2008 | Robertsson | ............... | G01V 1/36 |
| | | | | 702/189 |
| 2009/0245019 A1* | 10/2009 | Falkenberg | .......... | G01V 1/3835 |
| | | | | 367/17 |
| 2012/0072115 A1* | 3/2012 | Laws | ....................... | G01V 1/02 |
| | | | | 702/14 |
| 2013/0155810 A1* | 6/2013 | Dowle | ................. | G01V 1/3861 |
| | | | | 367/23 |
| 2013/0238249 A1* | 9/2013 | Xu | ......................... | G01V 1/303 |
| | | | | 702/18 |

FOREIGN PATENT DOCUMENTS

| | | | |
|---|---|---|---|
| GB | 2440033 | A | 1/2008 |
| GB | 2441344 | A | 3/2008 |
| WO | 2013/097295 | A2 | 6/2016 |
| WO | 2016083892 | A3 | 6/2016 |

OTHER PUBLICATIONS

Urruticoechea, Christian Reinicke, "Seismic blending and deblending of crossline sources," IDEA League, Master of Science in Applied Geophysics Research Thesis, Aug. 7, 2015, pp. 1-56.

* cited by examiner

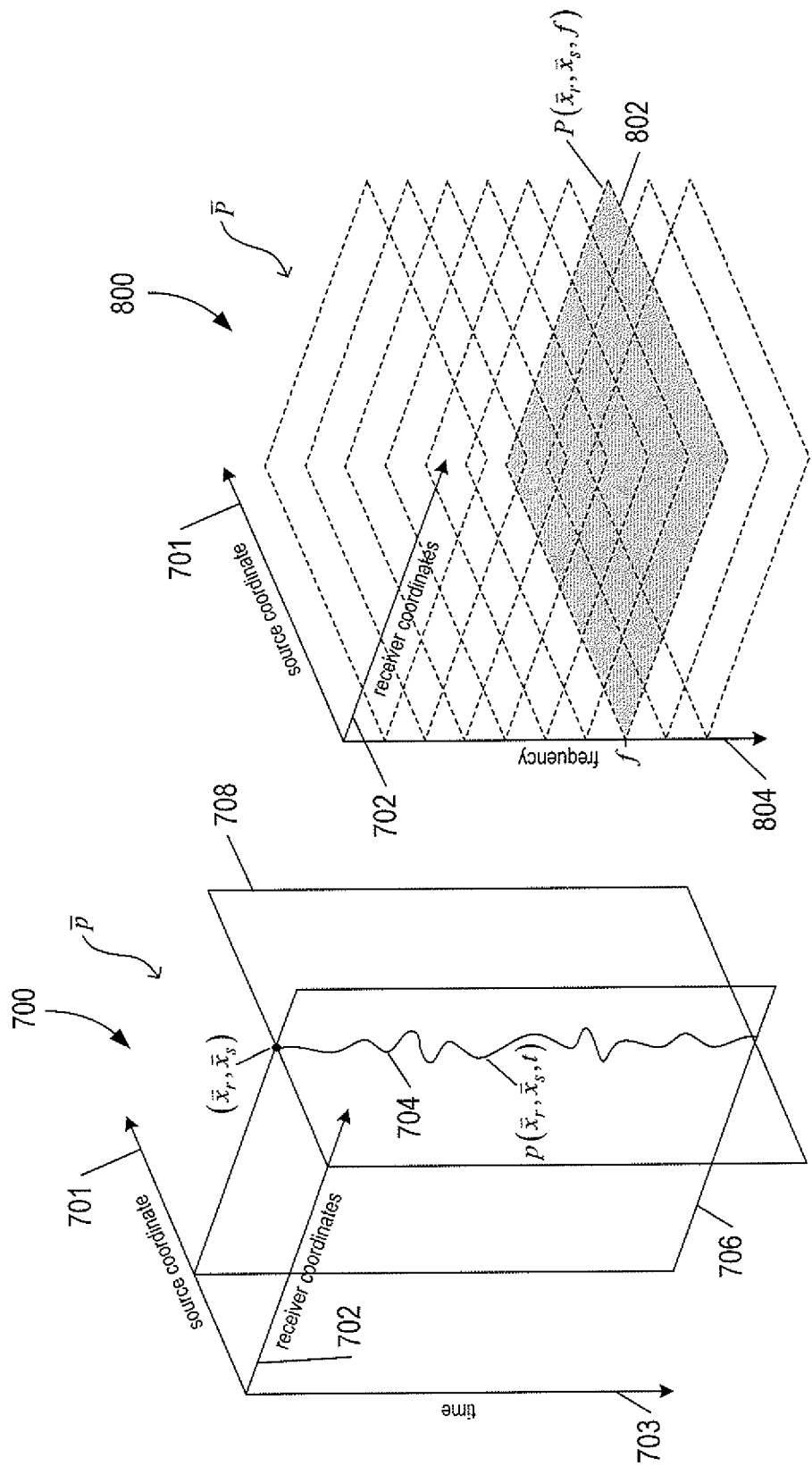

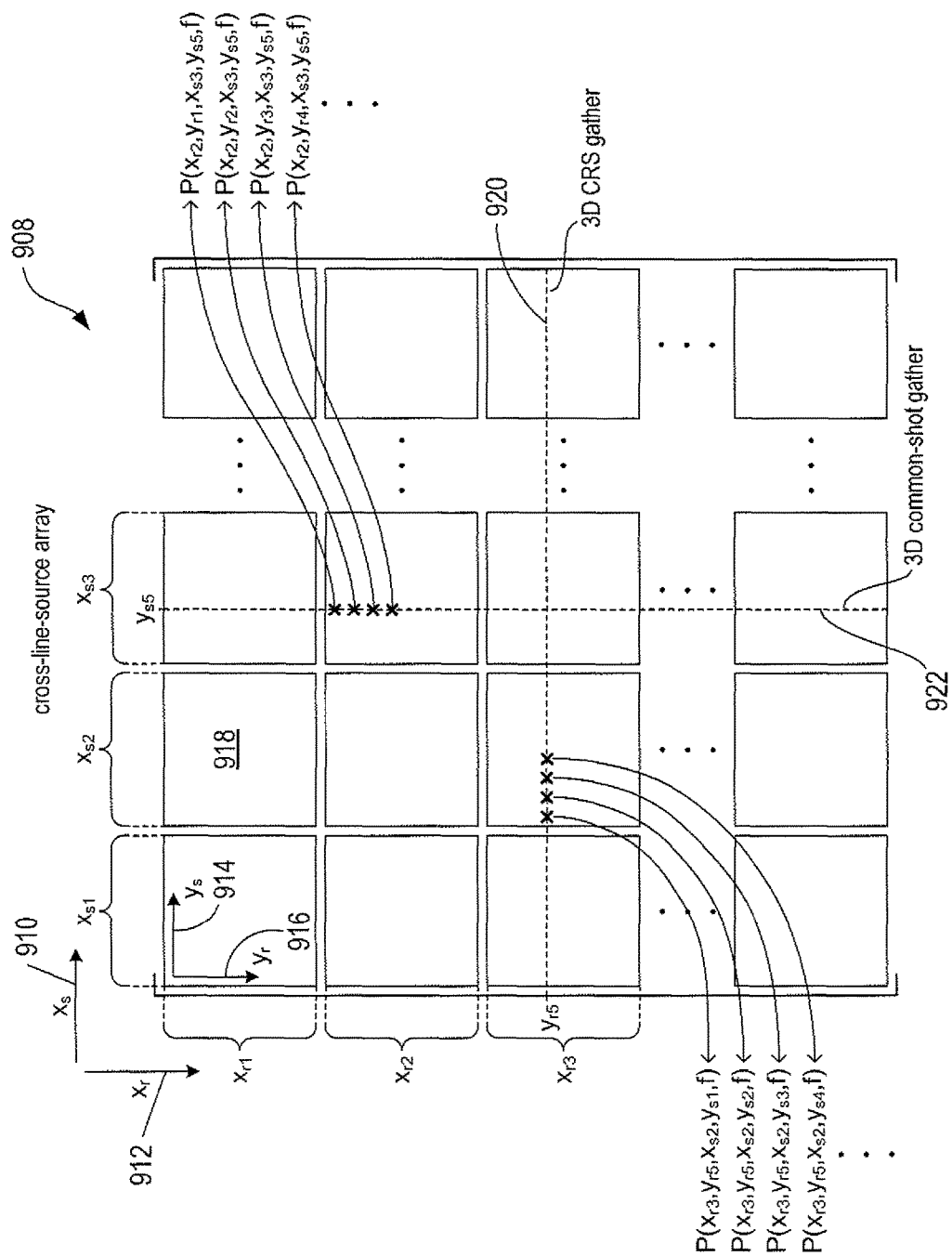

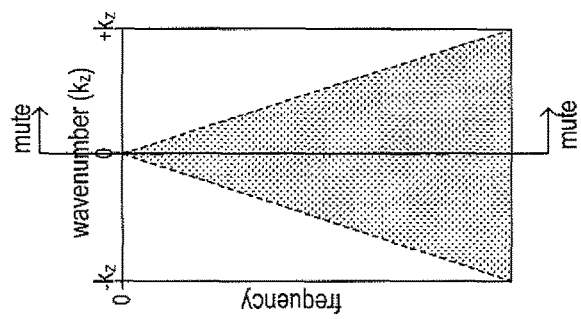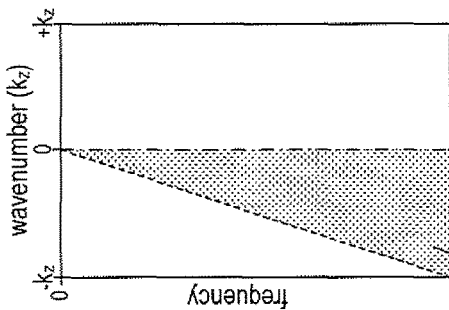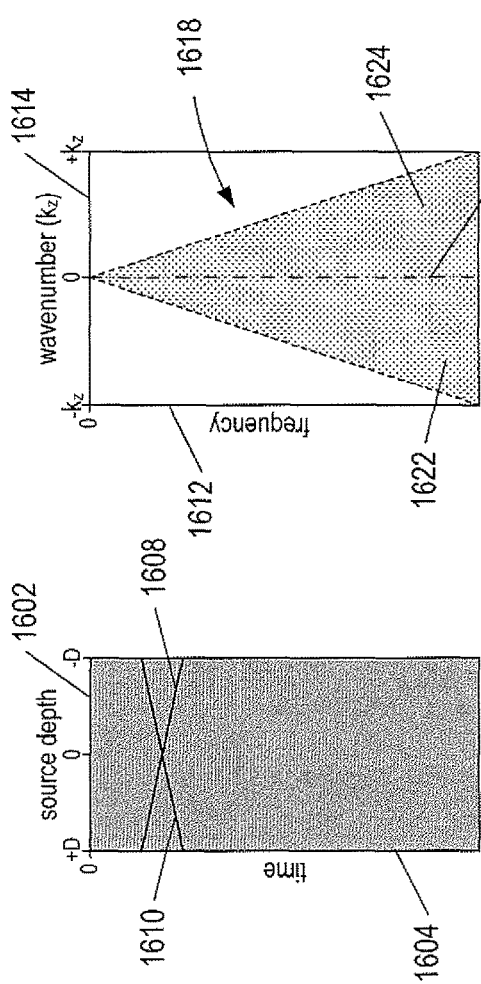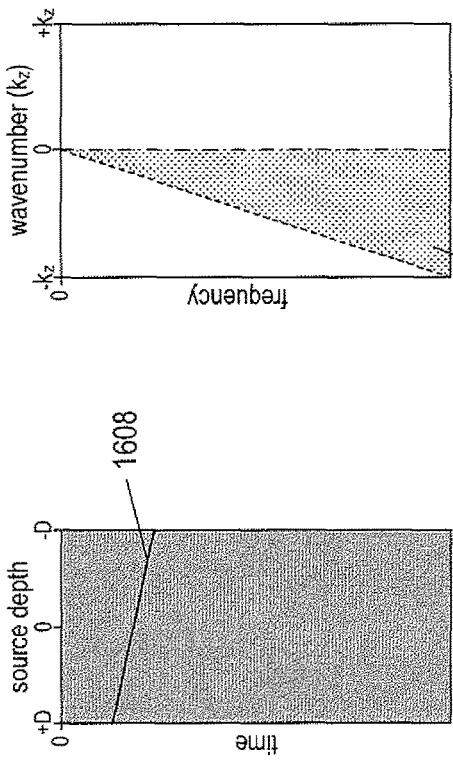

MARINE SURVEYS CONDUCTED WITH MULTIPLE SOURCE ARRAYS

CROSS-REFERENCE TO RELATED APPLICATION

This application claims the benefit of Provisional Application 62/246,283, filed Oct. 26, 2015.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images of a subterranean formation are used to determine the structure of subterranean formations, discover petroleum reservoirs, and monitor petroleum reservoirs during production. A typical marine seismic survey is carried out with a survey vessel that tows one or two seismic sources and a number of streamers through the body of water. The survey vessel contains seismic acquisition equipment, such as navigation control, seismic source control, seismic receiver control, and recording equipment. The seismic source control controls activation of the one or two seismic sources at selected times or locations. A seismic source typically comprises an array of source elements, such as air guns, that are simultaneously activated to produce an acoustic impulse. The acoustic impulse is a sound wave that travels down through the water and into a subterranean formation. At each interface between different types of rock and sediment, a portion of the sound wave is refracted, a portion of the sound wave is transmitted, and another portion is reflected back into the body of water to propagate toward the water surface. The streamers are elongated cable-like structures that are towed behind the survey vessel in the direction the survey vessel is traveling (i.e., sail-line direction) and are arranged substantially parallel to one another in the direction perpendicular to the sail-line direction. The streamers collectively form a seismic data acquisition surface. Each streamer includes a number of seismic receivers or sensors that detect pressure and/or particle motion wavefields of the sound waves reflected back into the water from the subterranean formation. The recorded pressure and/or particle motion wavefields are processed to produce seismic images of the subterranean formation.

In order to reduce the cost per square kilometer of three-dimensional seismic data acquisition and maximize the sub-surface area surveyed per sail line, marine seismology companies often deploy longer streamers with greater separation between the streamers as compared to more traditional marine surveys. For example, a traditional marine seismic survey may be carried out with ten 6,000 m long streamers separated by about 75 m By contrast, the acquisition time of a marine survey can be lower with sixteen 7,000 m long streamers separated by 100 m, and still lower with twelve 8,000 m long streamers separated by 150 m, and even lower with ten 10,000 m long streamers separated by 200 m. In terms of overall marine survey productivity these large streamer separations reduce data acquisition times from between 35% to 50%, which translates into a significant savings in time and costs.

However, efforts to lower cost by increasing streamer length and distances between streamers may have a downside in that the spatial resolution of the seismic data collected is typically lower than the seismic data collected in surveys carried out with shorter, more closely separated streamers for the following reasons. As the lengths of streamers are increased, the seismic recording time intervals between seismic source activations is increased in order to capture returning signals from longer source-receiver offsets. The longer recording time intervals necessitate more time between activations of the seismic sources and, therefore, a larger sail-line distance is traveled between activations of the seismic sources. In addition, as streamer separation increases from 100 m, to 150 m, to 200 m, cross-line sampling between streamers leads to spatial aliasing in the direction perpendicular to the sail-line direction. As a result, traditional dual seismic source acquisition techniques combined with longer streamer lengths and larger distances between streamers leads to a decrease in overall seismic data density, a decrease in the number of seismic source activations used to acoustically illuminate the subterranean formation, and increased spatial aliasing perpendicular to the sail-line direction. These factors impact the ability to adequately sample reflected wavefields from the subterranean formation, remove coherent noise, and provide sufficient spatial sampling to image complex subterranean geological structures.

DESCRIPTION OF THE DRAWINGS

FIG. 7 shows a full seismic data gather and example trace.

FIG. 8 shows a volume of seismic data in a space-frequency domain.

FIGS. 9A-9C show examples of two- and three-dimensional seismic data matrices in a space-frequency domain.

FIGS. 16A-16E shows source deghosting applied to a common-receiver-station gather.

DETAILED DESCRIPTION

Marine surveys carried out with multiple source arrays are described. Multiple source arrays may be used in marine surveys carried out with longer streamers and greater separation between streamers than in traditional marine surveys in order to lower marine survey costs. A multiple source array comprises three or more sources towed behind a survey vessel. Each source of a multiple source array comprises an array of source elements. A source element may be an air gun, a water gun, or a marine vibrator. The sources of a multiple source array may be arranged and towed in a particular type of configuration. The sources may be activated at that same time, according to a particular sequence, or at different times in order to acoustically illuminate a subterranean formation with source wavefields that in turn produce reflected wavefields from the subterranean formation. The sources of a multiple source array may be activated so that the source wavefields overlap and the reflected wavefields are blended and recorded as blended seismic data. Methods to deblend, source deghost, and attenuate noise in blended seismic data obtained using a multiple source array are described. The sources of the multiple source arrays may be arranged in the cross-line direction and spaced apart to maximize source wavefield interactions with a subsurface area per sail line traveled by the survey vessel. The sources of a multiple source array may be arranged vertically or along diagonals of a bent configuration and activated at different depths in order to avoid generating source ghosts at the same frequency notches for an entire survey.

Figure 1A:
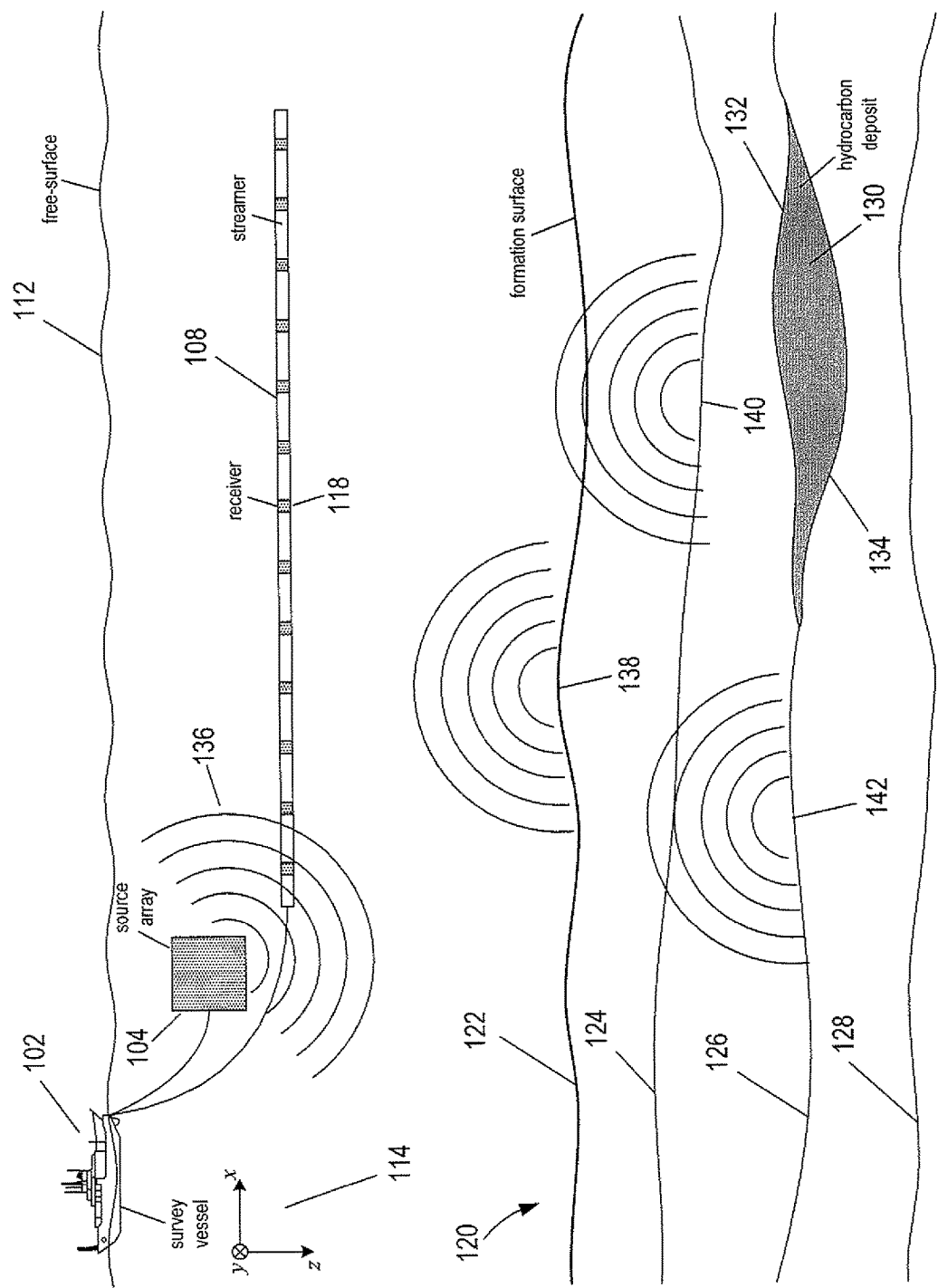
FIGS. 1A-1B show side-elevation and top views of an example seismic data acquisition system.
Figure 1B:
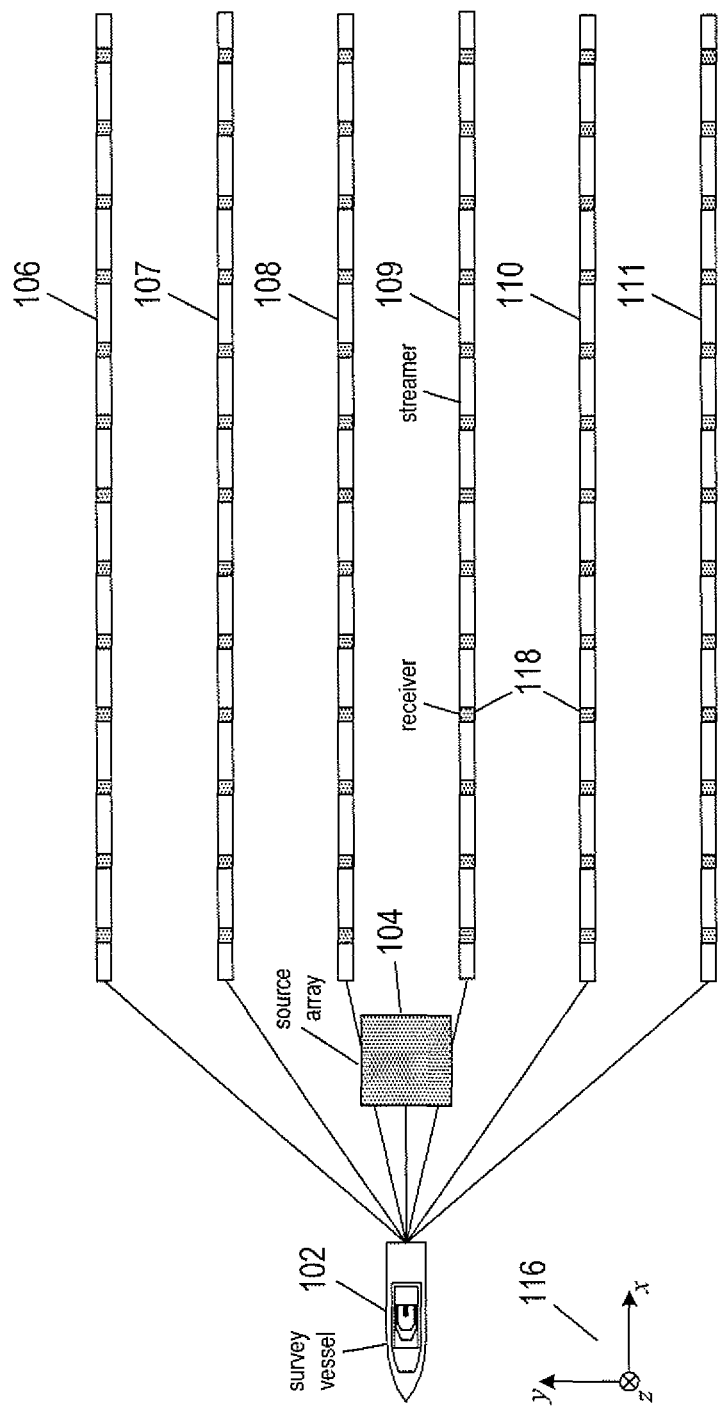

FIGS. 1A-1B show side-elevation and top views, respectively, of an example seismic data acquisition system that includes a survey vessel 102 towing a multiple source array 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form an ideally planar horizontal data acquisition surface with respect to the free surface 112. However, in practice, the data acquisition surface and streamers may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. The multiple source array 104 comprises three or more sources described below with reference to FIGS. 4-6.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

Figure 2A:
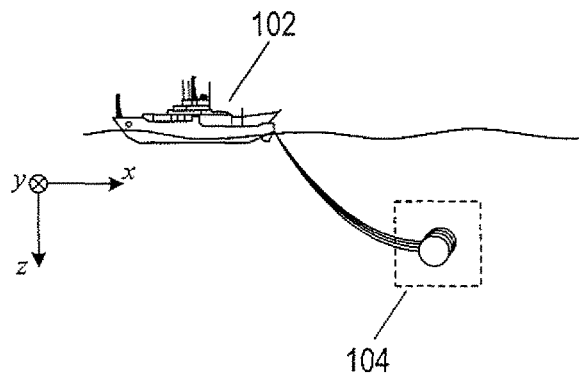
FIGS. 2A-2B show side elevation and top views of a cross-line source array.
Figure 2B:
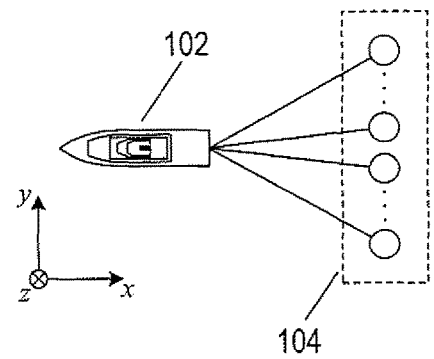
Figure 3A:
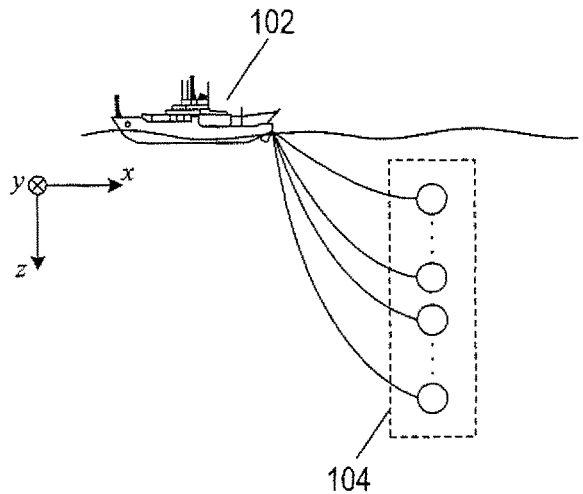
FIGS. 3A-3B show side elevation and top views of a vertical-source array.
Figure 3B:
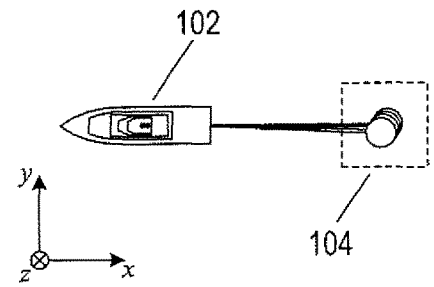
Figure 4A:
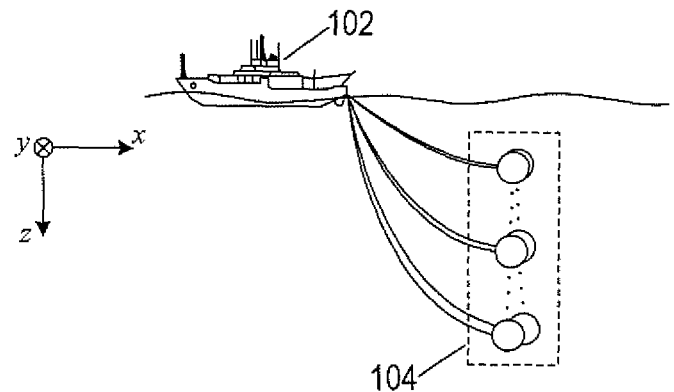
FIGS. 4A-4C show side elevation, top, and rear views of a bent-source array.
Figure 4B:
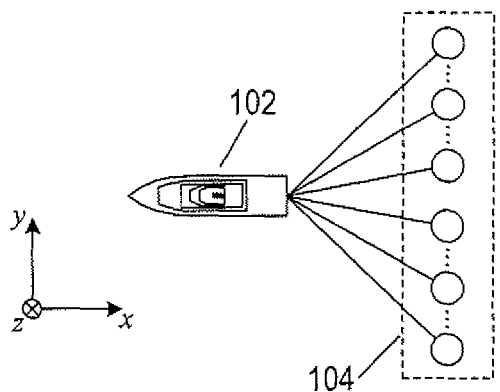
Figure 4C:
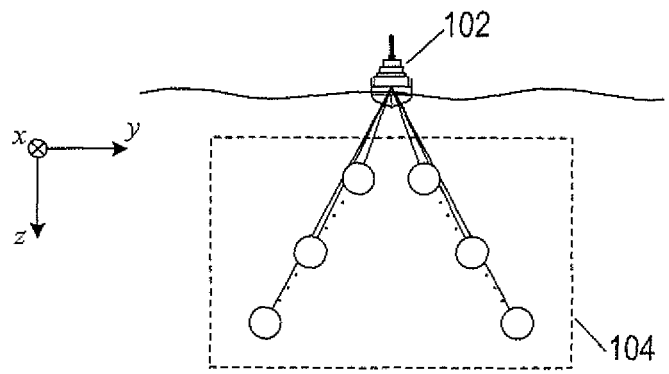

The multiple source array 104 may comprise two or more sources towed behind the survey vessel 102 in a particular configuration. FIGS. 2A-2B show side elevation and top views, respectively, of the multiple source array 104 in which the sources are towed behind the survey vessel 102 in a substantially linear configuration in the cross-line direction (i.e., y-direction). The multiple source array 104 in which the sources are linearly arranged in the cross-line direction is called a "cross-line source array." The sources may be spaced with approximately equal distance between adjacent sources in the cross-line direction. FIGS. 3A-3B show side elevation and top views, respectively, of the multiple source array 104 in which the sources are towed behind the survey vessel 102 in a substantially vertical direction (i.e., z-direction). The multiple source array 104 in which the sources are substantially linearly arranged in the vertical direction is called a "vertical-source array." The sources may be spaced with approximately equal distance between adjacent sources in the vertical direction. The sources of the multiple source array 104 may also be towed behind the survey vessel 102 as shown in FIGS. 4A-4C. The multiple source array 104 in which the sources are arranged along substantially linear diagonal directions as shown in FIGS. 4A-4C is called a "bent-source array." The sources may be spaced with approximately equal distance between adjacent sources along two downward directed diagonal lines with respect to the vertical direction.

Figure 5:
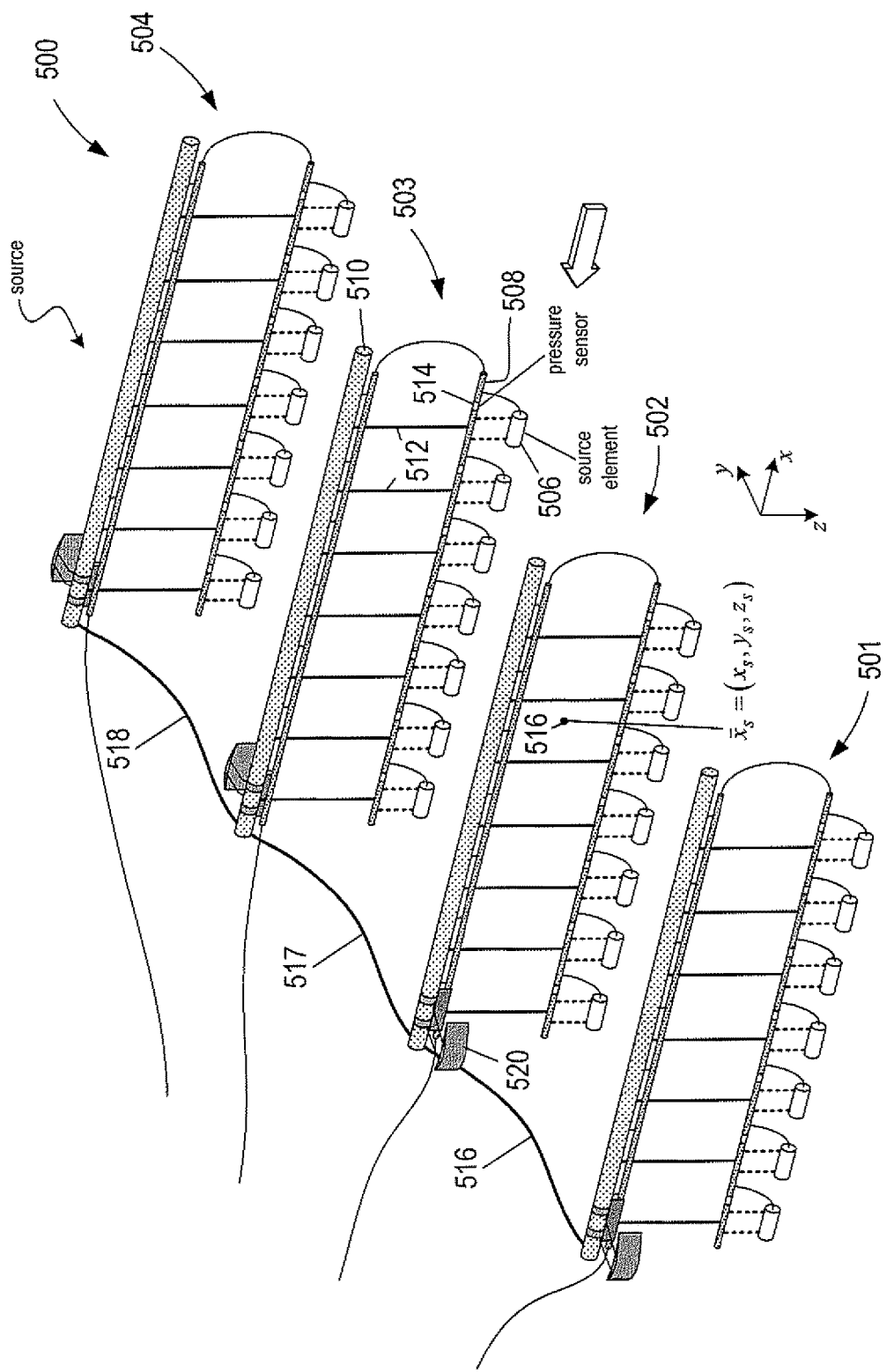
FIG. 5 shows an isometric view of a source.

Each source of the multiple source array 104 comprises sub-arrays of source elements. The source elements may be air guns or water guns. FIG. 5 shows an isometric view of an example source 500 that comprises four similarly configured sub-arrays 501-504. For example, the sub-array 503 includes seven source elements, such as source element 506, suspended from a semi-rigid rod 508 that is suspended from a float 510 by depth ropes 512. The sub-array 503 also includes seven pressure sensors, such as pressure sensor 514, that are each located in close proximity to one of the source elements. For example, the pressure sensor 514 is located in the near field (e.g., approximately 1 m to less than 10 m) of the source element 506. Point 516 represents the geometrical center of the sources of the source 500, where $\vec{x}_s$ represents the Cartesian coordinates $(x_s, y_s, z_s)$ of the geometrical center of the source elements of the source 500. The sub-arrays 501-504 are connected by cables 518-520, and each sub-array may include a steering device, such as a wing, that may be used to separately steer and control the direction the sub-array travels while being towed through the body of water. For example, the sub-array 502 includes a wing 522 that may be used to control the lateral direction of the sub-array 502.

Returning to FIG. 1A, FIG. 1A shows a cross-sectional view of the survey vessel 102 towing the multiple source array 104 above a subterranean formation 120. Curve 122, the formation surface, represents a top surface of the subterranean formation 120 located at the bottom of the body of water. The subterranean formation 120 may comprise a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, a seismic source control located on the survey vessel 102 activates the three or more sources comprising the multiple source array 104. The sources may be activated to produce blended acoustic signals at spatial and/or temporal intervals (see discussion below with reference to FIG. 20). Activation of each source of the multiple source array 104 is often called a "shot." In other implementations, the multiple source array 104 may be towed by one survey vessel and the streamers may be towed by a different survey vessel. FIG. 1A shows an acoustic signal expanding outward from the multiple source array 104 as a pressure wavefield 136 represented by semicircles of increasing radius centered at the multiple source array 104. The outwardly expanding wavefronts from the multiple source array may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the multiple source array 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the multiple source array 104 may receive the pressure disturbance sooner than a more distant-lying point on the formation surface 122. Thus, the times at which waves are reflected from various points within the subterranean formation 120 may be related to the distance, in three-dimensional space, of the points from the activated multiple source array 104.

Acoustic and elastic waves, however, may travel at different velocities within different materials as well as within the same material under different pressures. Therefore, the travel times of the source wavefield and reflected wavefield may be functions of distance from the multiple source array 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Each receiver 118 may be a multi-component sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time.

Figure 6:
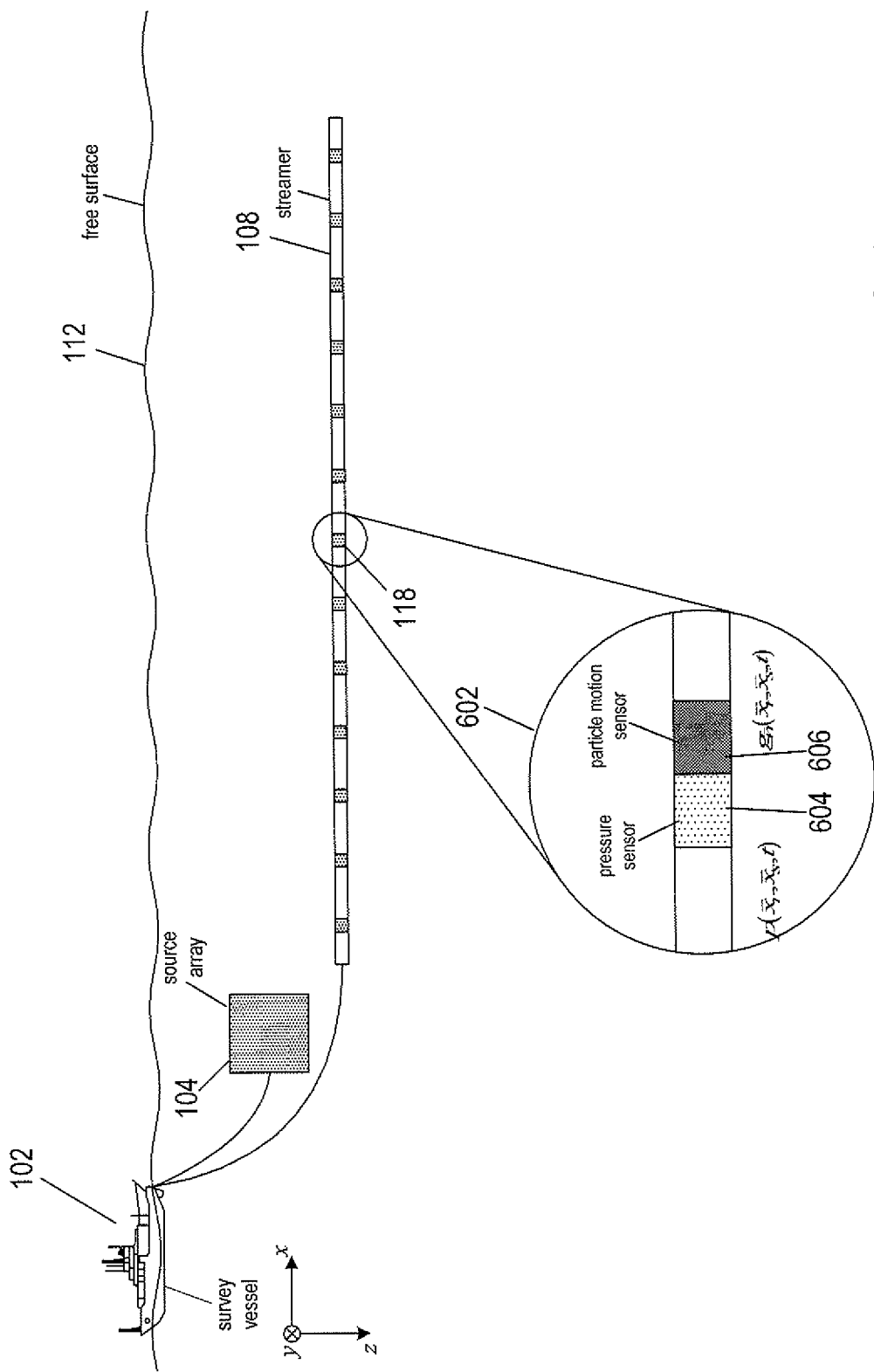
FIG. 6 shows a side-elevation view of a seismic data acquisition system with a magnified view of a receiver.

FIG. 6 shows a side-elevation view of the marine seismic data acquisition system with a magnified view 602 of the receiver 118. The receiver 118 is a multi-component sensor that comprises a pressure sensor 604 and a particle motion sensor 606. The pressure sensor may be, for example, a hydrophone. Each pressure sensor is a non-directional sensor that measures changes in hydrostatic pressure over time to produce pressure data denoted by p($\vec{x}_r$, $\vec{x}_s$, t), where represents the Cartesian coordinates ($x_r$, $y_r$, $z_r$) of a receiver, and t represents time. The particle motion sensors may be responsive to water motion. In general, particle motion sensors detect particle motion (i.e., displacement, velocity, or acceleration) in a particular direction and may be responsive to such directional displacement of the particles, velocity of the particles, or acceleration of the particles. A particle motion sensor that measures particle displacement generates particle displacement data denoted by $g_{\vec{n}}$($\vec{x}_r$, $\vec{x}_s$, t), where the vector $\vec{n}$ represents the direction along which particle displacement is measured. A particle motion sensor that measures particle velocity (i.e., particle velocity sensor) generates particle velocity data denoted by $v_{\vec{n}}$($\vec{x}_r$, $\vec{x}_s$, t). A particle motion sensor that measures particle acceleration (i.e., accelerometer) generates particle acceleration data denoted by $a_{\vec{n}}$($\vec{x}_r$, $\vec{x}_s$, t). The data generated by one type of particle motion sensor may be converted to another type. For example, particle displacement data may be differentiated to obtain particle velocity data, and particle acceleration data may be integrated to obtain particle velocity data.

The term "particle motion data" is a general term that refers to particle displacement data, particle velocity data, or particle acceleration data, and the term "seismic data" refers to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n}$=(0, 0, z)) in which case $g_z$($\vec{x}_r$, $\vec{x}_s$, t) is called vertical displacement data, $v_z$($\vec{x}_r$, $\vec{x}_s$, t) is called vertical velocity data, and $a_z$($\vec{x}_r$, $\vec{x}_s$, t) is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "•" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z$($\vec{x}_r$, $\vec{x}_s$, t), each receiver may include a particle motion sensor that measures the wavefield in the in-line direction in order to obtain the inline velocity data, $v_x$($\vec{x}_r$, $\vec{x}_s$, t), and a particle motion sensor that measures the wavefield in the cross-line direction in order to obtain the cross-line velocity data, $v_y$($\vec{x}_r$, $\vec{x}_s$, t). In certain implementations, the receivers may comprise only pressure sensors, and in other implementations, the receivers may c only particle motion sensors.

The streamers 106-111 and the survey vessel 102 may include sensing electronics and data-processing facilities that allow seismic data generated by each receiver to be correlated with the time each source of the multiple source array 104 is activated, absolute positions on the free surface 112, and absolute three-dimensional positions with respect to an arbitrary three-dimensional coordinate system. The pressure data and particle motion data may be stored at the receiver, and/or may be sent along the streamers via data transmission cables to the survey vessel 102, where the data may be stored electronically or magnetically on data-storage devices located onboard the survey vessel 102 and/or transmitted onshore to a seismic data-processing facility.

Each pressure sensor and particle motion sensor, or each group of such sensors, may include an analog-to-digital converter that converts time-dependent analog signals into discrete time series of consecutively measured values called "amplitudes" separated in time by a sample rate. The time series data generated by a pressure or particle motion sensor is called a "trace," which may comprise thousands of samples collected at a typical sample rate of about 1 to 5 ms. A trace is a recording of a subterranean formation response to acoustic energy that passes from an activated source, into the subterranean formation where a portion of the acoustic energy is reflected and/or refracted, and ultimately detected by a sensor as described above. A trace records variations in a time-dependent amplitude that corresponds to fluctuations in acoustic energy of the wavefield measured by the sensor. In general, each trace is an ordered set of discrete spatial and time-dependent pressure or motion sensor amplitudes denoted by:

$$tr(\vec{x}_r, \vec{x}_s, t) = \{A(\vec{x}_r, \vec{x}_s, t_j)\}_{j=0}^{J-1} \quad (1)$$

where tr represents pressure, particle displacement, particle velocity, or particle acceleration amplitude;

A is amplitude;

$t_j$ is the jth sample time; and

J is the number of time samples in the trace.

The coordinate location $\vec{x}_r$ of each receiver may be calculated from global position information obtained from one or more global positioning devices located along the streamers, survey vessel, and buoys and the known geometry and arrangement of the streamers and receivers. The coordinate location $\vec{x}_s$ of each source within the multiple source array 104 may also be obtained from one or more global positioning devices located at each source and the known geometry and arrangement of the sources within the multiple source array 104. Each trace may also include a trace header not represented in Equation (1) that identifies the specific receiver that generated the trace, receiver and source GPS spatial coordinates, and may include time sample rate and the number of time samples. The traces may be recorded in recording equipment located on board the survey vessel 102.

The traces are collected to form a "gather" that can be further processed using various seismic data processing techniques in order to obtain information about the structure of the subterranean formation. FIG. 7 shows a seismic data set 700 collected for a number of different source and receiver coordinate locations. Axis 701 represents source coordinates, axis 702 represents receiver coordinates, and axis 703 represents time. A trace 704 of seismic data p($\vec{x}_r$, $\vec{x}_s$, t), as described above with reference to Equation (1), for an acoustic signal generated by a source at a source location $\vec{x}_s$ of a multiple source array and measured by a receiver, such as a pressure sensor or particle motion sensor, at a receiver location $\vec{x}_r$. Note that the wiggle in the trace 704 does not represent time-dependent variation with respect to receiver and source coordinates. The wiggle in the trace 704 represents time-dependent variation in the pressure by a pressure sensor located at the source location $\vec{x}_s$ and the receiver location $x_r$. Traces of seismic data not shown in FIG. 7 are recorded for other source and receiver locations represented by source and receiver axes 701 and 702. The traces are collected to form the seismic data set 700:

$$\vec{p}(\vec{x}_r, \vec{x}_s, t) = \{p(\vec{x}_r, \vec{x}_s, t)\} \quad (2)$$

The traces in the seismic data set 700 may be sorted into different domains, such as the common-shot domain, common-receiver-station domain, common-channel domain, and common-midpoint domain. For example, rectangle 706 represents a common-shot gather of traces having the same source location and different receiver locations, such as traces collected along the same streamer. Rectangle 708 represents a common-receiver-station gather of traces having different source locations but the trace are generated by different receivers that pass over the same or common-receiver-station location.

Note that in the following discussion the general term "seismic data" is used to refer to pressure data, particle motion data, particle velocity data, and particle acceleration data. The notation, p, is used to represent pressure data, particle motion data, particle velocity data, or particle acceleration data in mathematical formulas discussed below, unless stated otherwise. The methods and systems discussed below are not intended to be limited to pressure data and may be used with particle motion data, particle velocity data, and particle acceleration data described above.

A Fourier transform may be used to transform the seismic data set 700 from the space-time ("s-t") domain to the space-frequency ("s-f") domain as follows:

$$\mathcal{F}_{t \to f}(\vec{p}(\vec{x}_r, \vec{x}_s, t)) = \overline{P}(\vec{x}_r, \vec{x}_s, f) \quad (3)$$

where
$\mathcal{F}_{t \to f}$ is a time-to-frequency domain Fourier transform; and
$\overline{P}$ is seismic data set in the s-f domain.

FIG. 8 shows a seismic data set 800, denoted by $\overline{P}$, in the s-f domain produced by applying a Fourier transform with respect to time to the seismic data set 700. Axis 801 represents frequencies denoted by f. The dashed line layers in the seismic data set 800 represent seismic data matrices for different frequencies. For example, shaded layer 802 represents a seismic data matrix denoted by $P(\vec{x}_r, \vec{x}_s, f)$ for a single frequency f. The seismic data set $\overline{P}$ has a seismic data matrix P for each frequency.

Figure 9A:
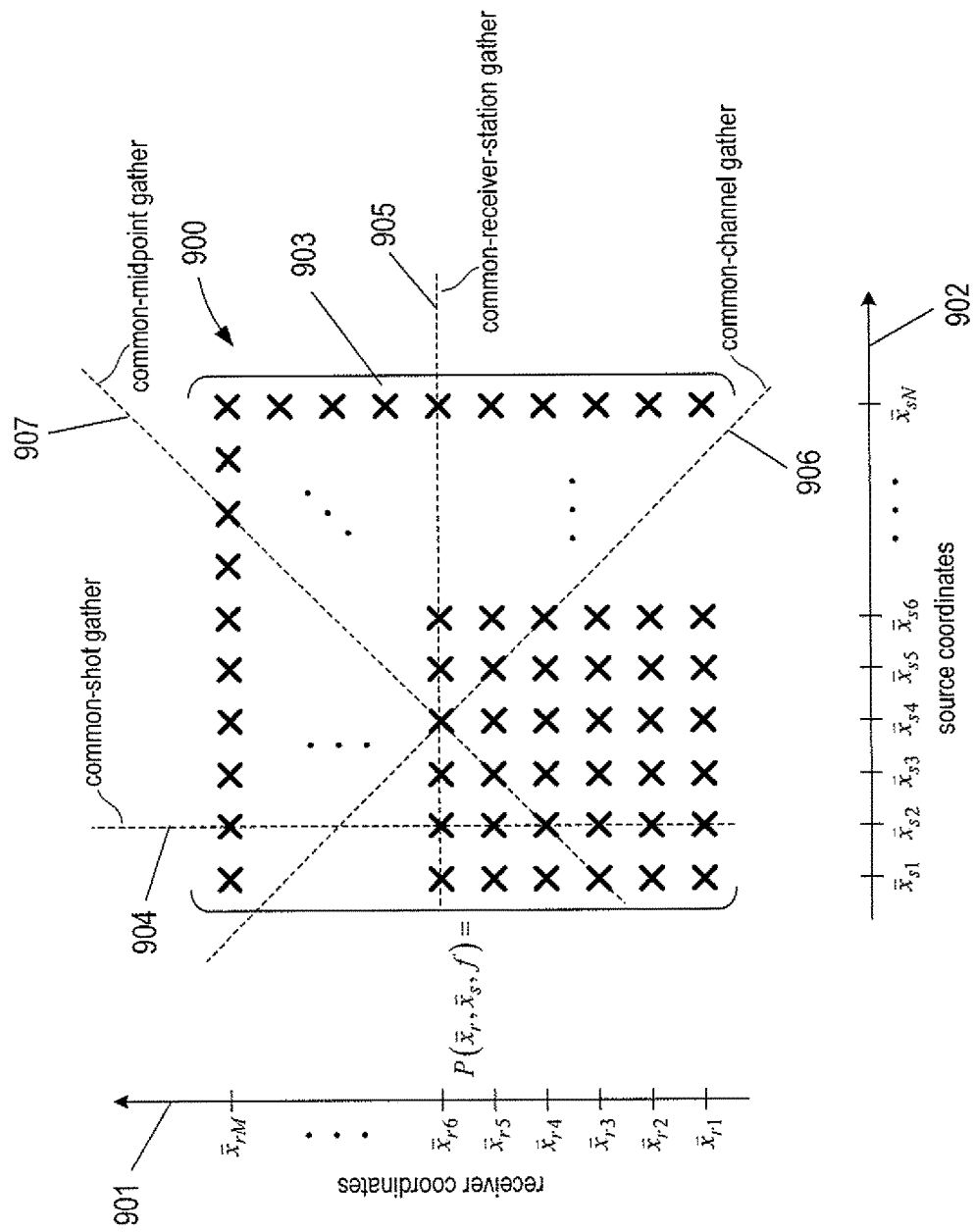

FIG. 9A shows a two-dimensional seismic data matrix 900 for a single frequency of a seismic data set in the s-f domain. Vertical axis 901 represents receiver locations, and horizontal axis 902 represents source locations. In this example, N represents the number of sources of a multiple source array and M represents the number of receivers. Each X, such as X 903, within the seismic data matrix 900 represents seismic data generated by a receiver at a receiver location as a result of activating a source of the multiple source array at a source location.

FIG. 9B shows an example of a three-dimensional seismic data matrix 908 for a single frequency of a seismic data set in the s-f domain generated by a cross-line source array. Directional arrows 910 and 912 represent in-line source and receiver coordinates, respectively. Each square represents a submatrix of seismic data associated with a particular pair of in-line source and receiver coordinates and the ranges of cross-line receiver and source coordinates. For example, directional arrows 914 and 916 represent cross-line source and receiver coordinates, respectively. Submatrix 918 represents seismic data generated by a source at in-line receiver coordinate $x_{r1}$ and in-line source coordinate $x_{s2}$ for a range of cross-line coordinate receiver and source coordinates $y_r$ and $y_s$. Dashed line 920 represent a three-dimensional common-receiver-station gather, and dashed line 922 represents a three-dimensional common-shot gather. On the other hand, three-dimensional common channel gather and common midpoint gather are broken up over the submatrices.

Figure 9C:
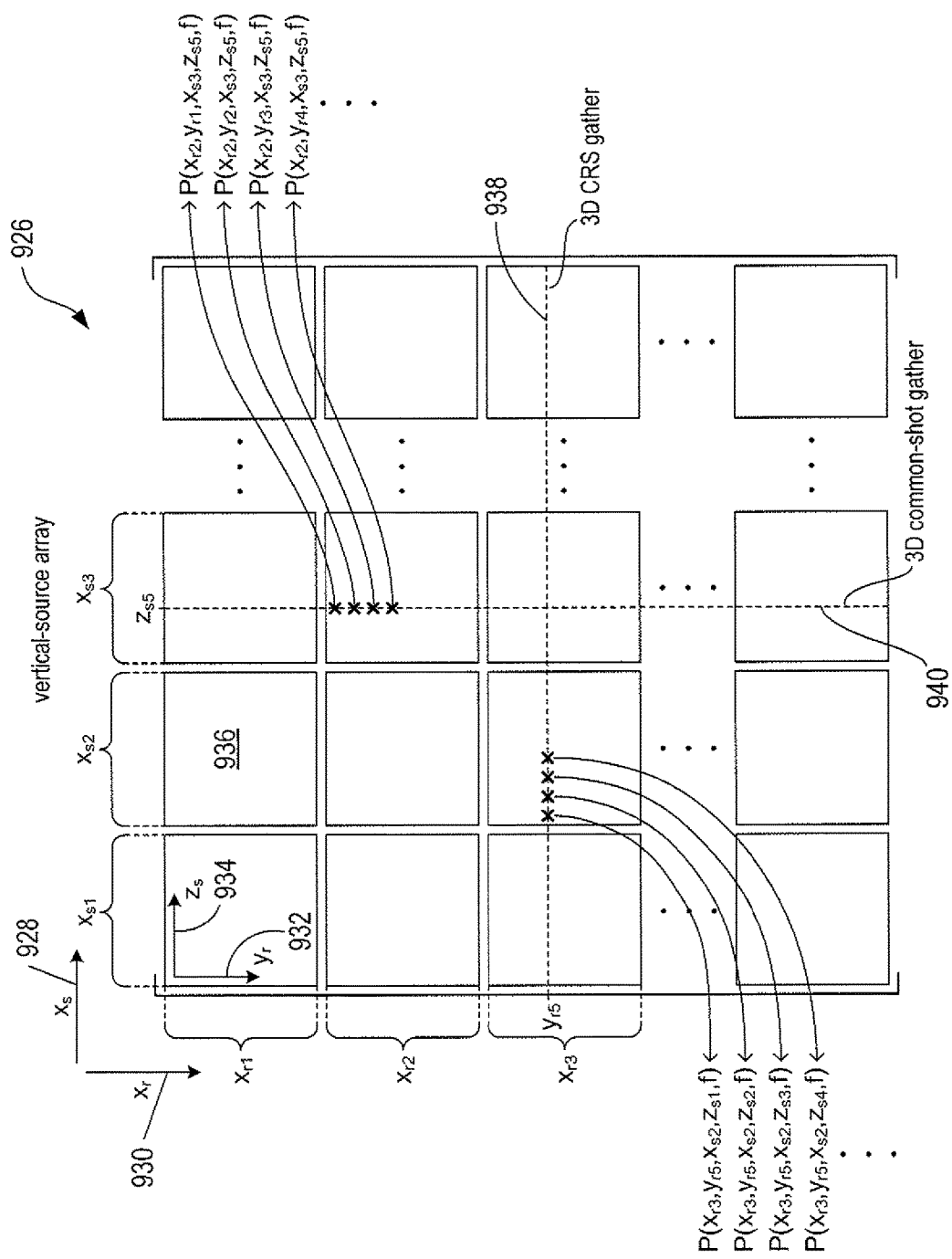

FIG. 9C shows an example of a three-dimensional seismic data matrix 926 for a single frequency of a seismic data set in the s-f domain generated by a vertical-source array. Directional arrows 928 and 930 represent in-line source and receiver coordinates, respectively. Each square represents a submatrix of seismic data associated with a particular pair of in-line source and receiver coordinates and ranges of cross-line receiver and vertical source coordinates. For example, directional arrows 932 and 934 represent cross-line receiver and vertical source coordinates, respectively. Submatrix 936 represents a seismic data generated by a source at in-line receiver coordinate $x_{r1}$ and in-line source coordinate $x_{s2}$ for a range cross-line coordinate receiver coordinates $y_r$ and vertical source coordinates $z_s$. Dashed line 938 represent a three-dimensional common-receiver-station gather, and dashed line 940 represents a three-dimensional common-shot gather. On the other hand, three-dimensional common channel gather and common midpoint gather are broken up over the submatrices.

The seismic data in the seismic data matrix may be sorted into different domains determined by the source and receiver coordinates. Different domains include a common-shot domain, common-channel domain, common-receiver-station domain, and common-midpoint ("CMP") domain. FIG. 9A shows different ways seismic data of the seismic data matrix 900 may be sorted into different domains. A dashed line 904 represents a common-shot gather formed from the seismic data generated by the receivers and one of the sources of the multiple source array activated at a source location. A dashed line 905 represents a common-receiver-station gather formed from the seismic data generated by receivers that pass over the same receiver-coordinate location for the sources of the multiple source array activated at the N different source locations. Diagonal dashed line 906 represents a common-channel gather of seismic data. Seismic data generated by receivers at the receiver locations and source location along a diagonal represented by dashed line 907 are collected to form a common-midpoint ("CMP") gather. The CMP is the point on the formation surface halfway between the location of the source and the location of the receiver. The CMP is not to be confused with common depth points that are located below the CMP at interfaces within the subterranean formation.

Figure 10A:
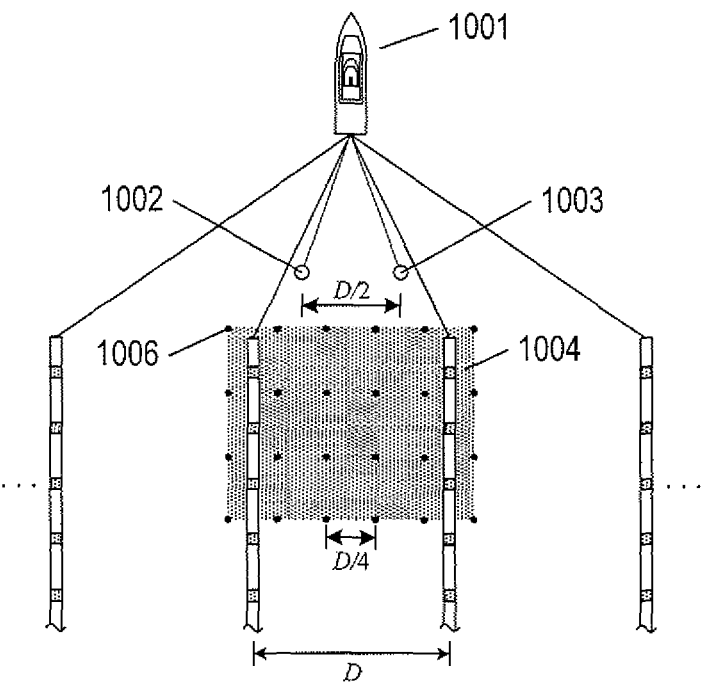
FIG. 10A shows a top view of a typical marine survey carried out with a survey vessel and two seismic sources space apart in the cross-line direction.
Figure 10B:
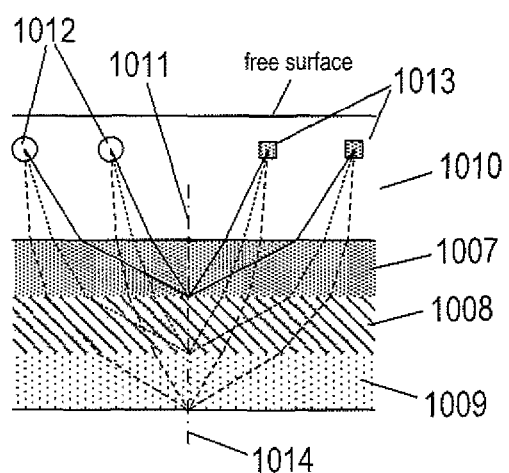
FIG. 10B shows an elevation view of common midpoint and common depth points in three layers of a subterranean formation located beneath a body of water.
Figure 10C:
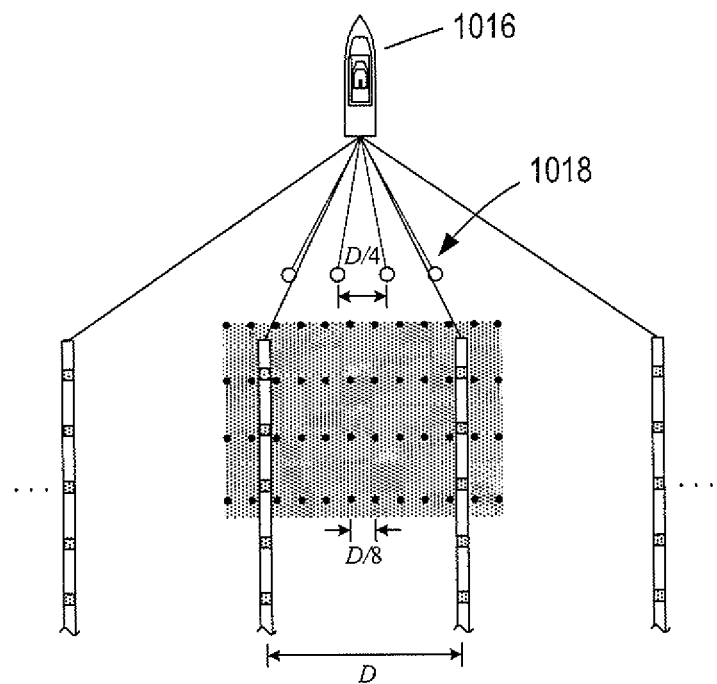
FIGS. 10C-10D shows top views of marine surveys carried out with cross-line source arrays.
Figure 10D:
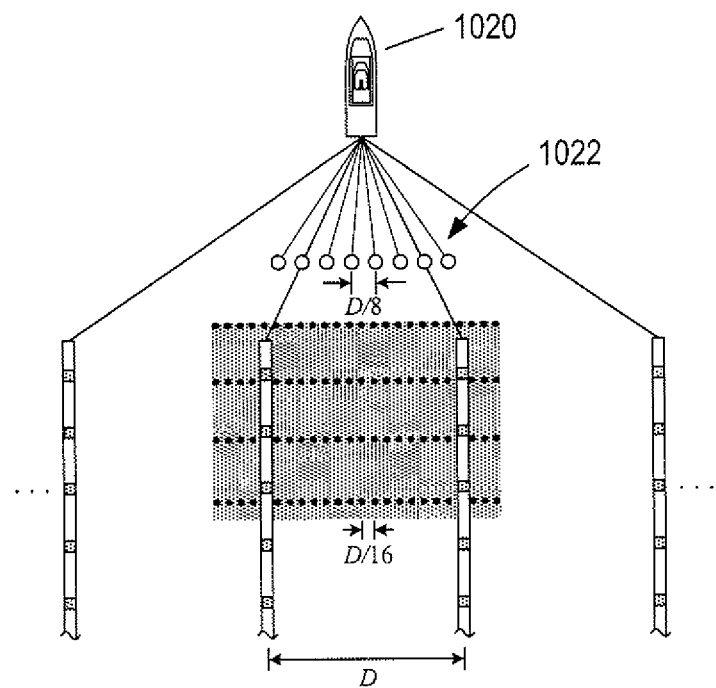

As the number of sources in a cross-line source array increases and separation distance between the sources decreases, the density of source wavefield interactions with a subterranean formation is increased. The concept of increasing the density of source wavefield interactions as the number of sources increases and separation distances between sources of a cross-line source array decreased is represented in FIGS. 10A-10D with CMPs. FIG. 10A shows a top view of a typical marine survey carried out with a survey vessel 1001 that tows two seismic sources 1002 and 1003 and a number of streamers of which only four streamers are shown. The streamers are separated by a distance D in the cross-line direction. Shaded region 1004 represents a region of the surface of a subterranean formation and dots represent CMPs. FIG. 10B shows a cross-sectional view of three different horizontal subterranean layers 1007-1009, represented by different shadings, of a subterranean formation located beneath a body of water 1010. A dot 1011 represents a CMP between source locations 1012 and receiver locations 1013. The CMP 1011 is located above common depth points, which corresponds to reflection points between the layers 1007-1009 along dot-dashed line 1014. The density of source wavefield interactions with a subterranean formation (i.e., increase the number of CMPs) may be increased by increasing the number of sources in a cross-line source array having a total overall length in the cross-line direction that is less than the distance D between streamers, as shown in FIGS. 10C and 10D. In FIG. 10C, a survey vessel 1016 tows a cross-line source array 1018 of four sources separated in the cross-line direction by about one quarter of the distance D (i.e., D/4) separating the streamers. The total length of the cross-line source array 1018 is about 3D/4. As a result, the CMPs are separated in the cross-line direction by about one eighth of the distance D (i.e., D/8) separating the streamers. In FIG. 10D, a survey vessel 1020 tows a cross-line source array 1022 of eight sources separated in the cross-line direction by about one eighth of the distance D (i.e., D/8) separating the streamers in the cross-line direction. The total length of the cross-line source array 1022 is about 7D/8. As a result, the CMPs are separated in the cross-line direction by about one sixteenth of the distance D (i.e., D/16) separating the streamers in the cross-line direction. In general, a cross-line source array of N sources has a total length in the cross-line direction less than D and the distance between each pair of adjacent sources is about D/N, which gives CMPs separated by D/2N in the cross-line direction.

Using cross-line source arrays that comprise three or more sources with a total cross-line source array length that is less than the distances separating the streamers increases the density of source wavefield interactions with the subterranean formation, which allows for a larger cross-line and in-line spacing between receivers located along the streamers. As a result, a larger volume space of a subterranean formation may be sampled by source wavefields per sail line, which results in a reduction in marine survey costs.

Figure 11A:
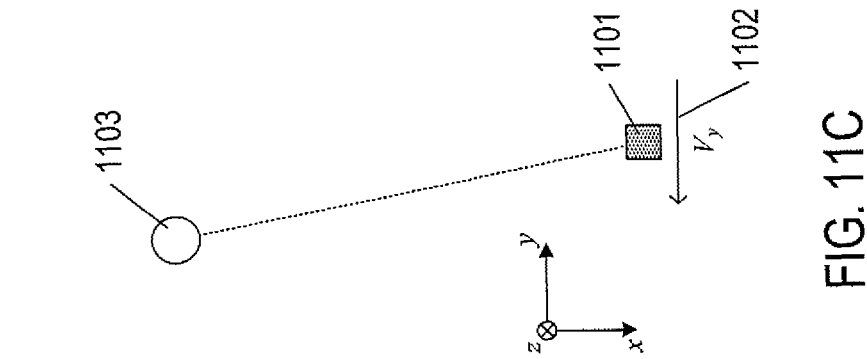
FIGS. 11A-11C shows cross-line locations of a source and receiver used to calculate cross-line particle velocity.
Figure 11B:
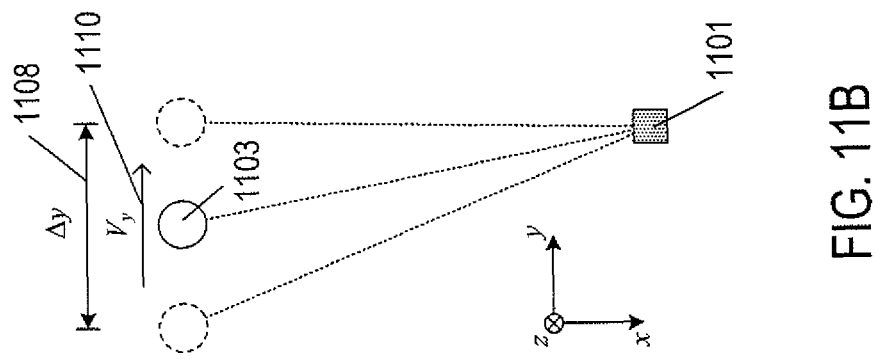
Figure 11C:
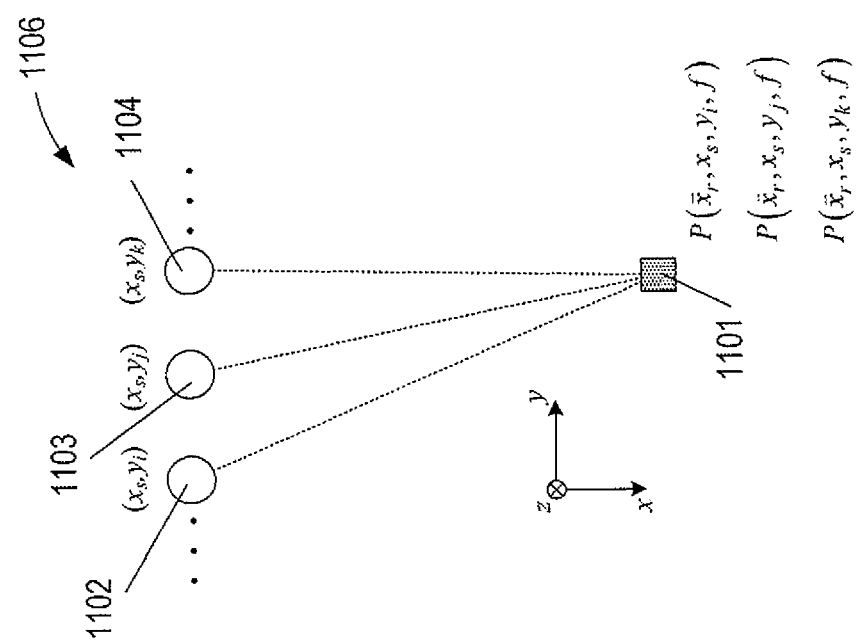

Cross-line source arrays and bent-source-array also enable calculation of particle velocity data in the cross-line direction at receiver locations by assuming source location reciprocity and using pressure data recorded at a receiver location. FIGS. 11A-11C show calculation of cross-line particle velocity at a receiver location 1101. In FIG. 11A, three different sources 1102-1104 of a cross-line, or bent, source array 1106 are activated at cross-line coordinate locations $(x_s, y_i)$, $(x_s, x_j)$, and $(x_s, y_k)$. Note that the z-coordinate in the following discussion is suppressed because the three sources 1102-1104 may belong to either a cross-line source array or a bent-source array. In this example, the quantities $P(\vec{x}_r, x_s, y_i, f)$, $P(\vec{x}_r, x_s, y_k, f)$, and $P(\vec{x}_r, x_s, y_k, f)$ represent pressure data measured at the same receiver location $\vec{x}$ for separate activations of the three sources 1102-1104. The relationship between the gradient of the pressure and the particle velocity in the general particle displacement direction $\vec{n}$ is given by $$V_{\vec{n}} = -\frac{i}{\rho\omega}\vec{n}\cdot\vec{\nabla}P \qquad (4)$$

where
i is the imaginary unit $\sqrt{-1}$;
$\rho$ is the density of water;
$\omega$ w is the angular frequency (i.e., $\omega=2\pi f$); and
$\vec{\nabla}P$ is the pressure gradient.

Setting the particle displacement direction $\vec{n}=(0,1,0)$ in Equation (4) (i.e., cross-line particle displacement direction) gives the cross-line velocity:

$$V_y = -\frac{i}{\rho\omega}\frac{\partial P}{\partial y} \qquad (5)$$

where $\partial P/\partial V$ is the pressure gradient in the cross-line direction.

An approximate cross-line particle velocity at a point between the sources 1102 and 1104 may be calculated by $$V_y \approx -\frac{i}{\rho\omega}\frac{\Delta P}{\Delta y} = -\frac{i}{\rho\omega}\frac{P(\vec{x}_r, x_s, y_k, f) - P(\vec{x}_r, x_s, y_i, f)}{y_k - y_i} \qquad (6)$$

The differential $\Delta y$ in the denominator of Equation (6) is calculated as the distance 1108 between the sources 1102 and 1104, as shown in FIG. 11B, and the differential $\Delta P$ in the numerator of Equation (5) is given by the difference between pressure data generated by receiver 1101 in response to activation of the sources 1102 and 1104. Equation (6) gives an approximate cross-line particle velocity at the location $y_j$ of the source 1103 and is represented by a vector 1110 (i.e., $(0, V_y, 0)$). In the example of FIG. 11, the location of the source 1103 represents a point between the sources 1102 and 1104. Note that the source 1103 does not have to be present in order to calculate the approximate cross-line particle velocity according to Equation (6) at a point between the sources 1102 and 1104. There may be zero or any number of other sources between the sources 1102 and 1104. Source location reciprocity is used to obtain an approximate cross-line particle velocity $(0, -V_y, 0)$ at the receiver location 1101 represented by a vector 1112 in FIG. 11C. As streamer separation is increased, the cross-line particle velocity $(0, -V_y, 0)$ may be used to interpolate cross-line particle velocities between adjacent streamers and thereby reduce cross-line spatial aliasing.

Seismic data is often contaminated with noise represented by $$p(\vec{x}_r, \vec{x}_s, t) = p_{des}(\vec{x}_r, \vec{x}_s, t) + n(\vec{x}_r, \vec{x}_s, t) \qquad (7)$$

where
$p_{des}(\vec{x}_r, \vec{x}_s, t)$ is a signal component of the seismic data; and
$n(\vec{x}_r, \vec{x}_s, t)$ is noise.

The signal component of the seismic data is typically coherent while the noise is incoherent. The noise may be the result of acoustic and non-acoustic energy, such as propeller noise, noise due to free surface waves, noise due to streamer vibrations typically caused by devices attached to the streamer, noise due to any irregularities on the streamer surface (e.g., barnacles), and other noise sources.

The frequency f of a sound wave, wavenumber k of the sound wave, and speed c of sound wave propagating in water are related by f=kc. Because the signal component of the seismic data propagates along the streamer at apparent speeds greater than or equal to c, the signal component lies within a signal region defined by frequency-to-wavenumber ratios greater than or equal to c (i.e., f/k>c). The signal region contains amplitudes associated with energy that propagates at speeds greater than or equal to c. The signal region will also contain any noise components that propagate at speeds greater than or equal to c. In other words, the noise $n(\vec{x}_r, \vec{x}_s, t)$ may be decomposed into low-speed noise and high-speed noise components as follows:

$$n(\vec{x}_r, \vec{x}_s, t) = n_{<c}(\vec{x}_r, \vec{x}_s, t) + n_{\geq c}(\vec{x}_r, \vec{x}_s, t) \quad (8)$$

where $n_{<c}(\vec{x}_r, \vec{x}_s, t)$ is low-speed noise that propagates at speeds less c; and $n_{\geq c}(\vec{x}_r, \vec{x}_s, t)$ is high-speed noise that propagates at speeds greater than c.

Figure 12:
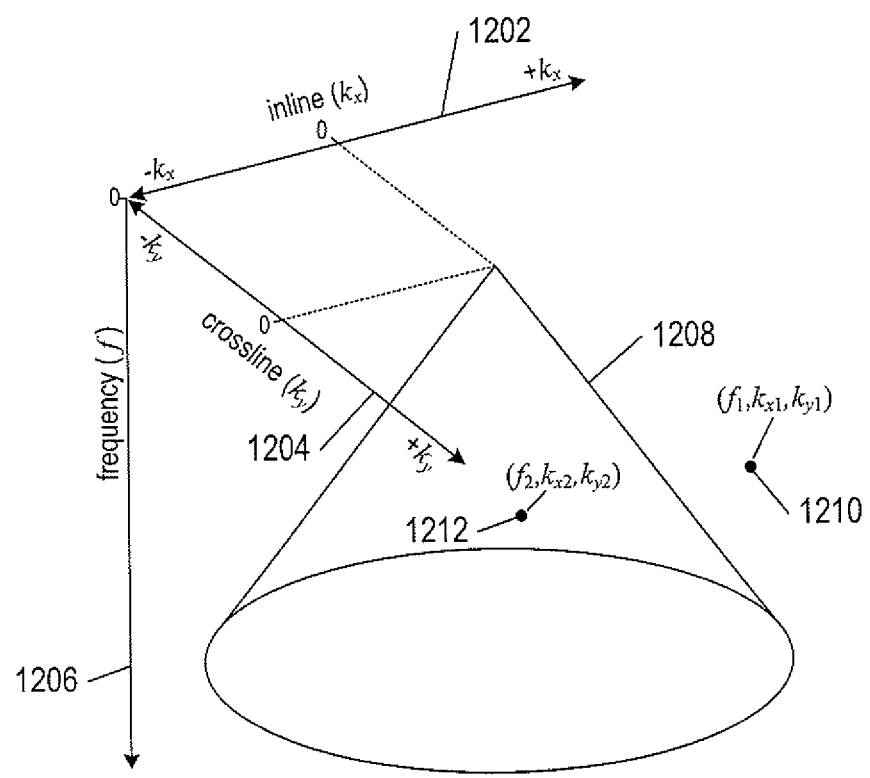
FIG. 12 shows the full seismic data gather in a wavenumber-frequency domain.

The signal region may be determined by transforming the seismic data set or a gather of seismic, shown in FIG. 7, from the s-t domain to a wavenumber-frequency ("w-f") domain. FIG. 12 shows seismic data, such as the seismic data set 700 or a gather of the seismic data set 700, transformed 1201 from the s-t domain to the w-f domain. In the w-f domain, axis 1202 represents in-line wavenumbers (i.e., $k_x$) and axis 1204 represents cross-line wavenumbers (i.e., $k_y$). Axis 1206 represents frequencies. A cone 1208 represents a signal region. The boundary of the signal region 1208 is given by $$c = \frac{f}{\sqrt{k_x^2 + k_y^2}} \quad (9)$$

Points outside the signal region, such as point $(f_1, k_{x1}, k_{y1})$ 1210, have speeds that are greater than the speed of sound in water c and satisfy the following condition:

$$c < \frac{f_1}{\sqrt{(k_{x1})^2 + (k_{y1})^2}} \quad (10)$$

Points inside the signal region, such as point $(f_2, k_{x2}, k_{y2})$ 1212, have speeds that are less than or equal to the speed of sound in water c and satisfy the following condition:

$$\frac{f_2}{\sqrt{(k_{x2})^2 + (k_{y2})^2}} \leq c \quad (11)$$

Points located inside the signal region 1208 correspond to the signal component of the seismic data and any noise that propagates at speeds less than or equal to the speed of sound in water c. While points located outside the signal region 1208 correspond to noise that propagates at speeds greater than then speed of sound in water.

Figures 13A, 13B, 13C:
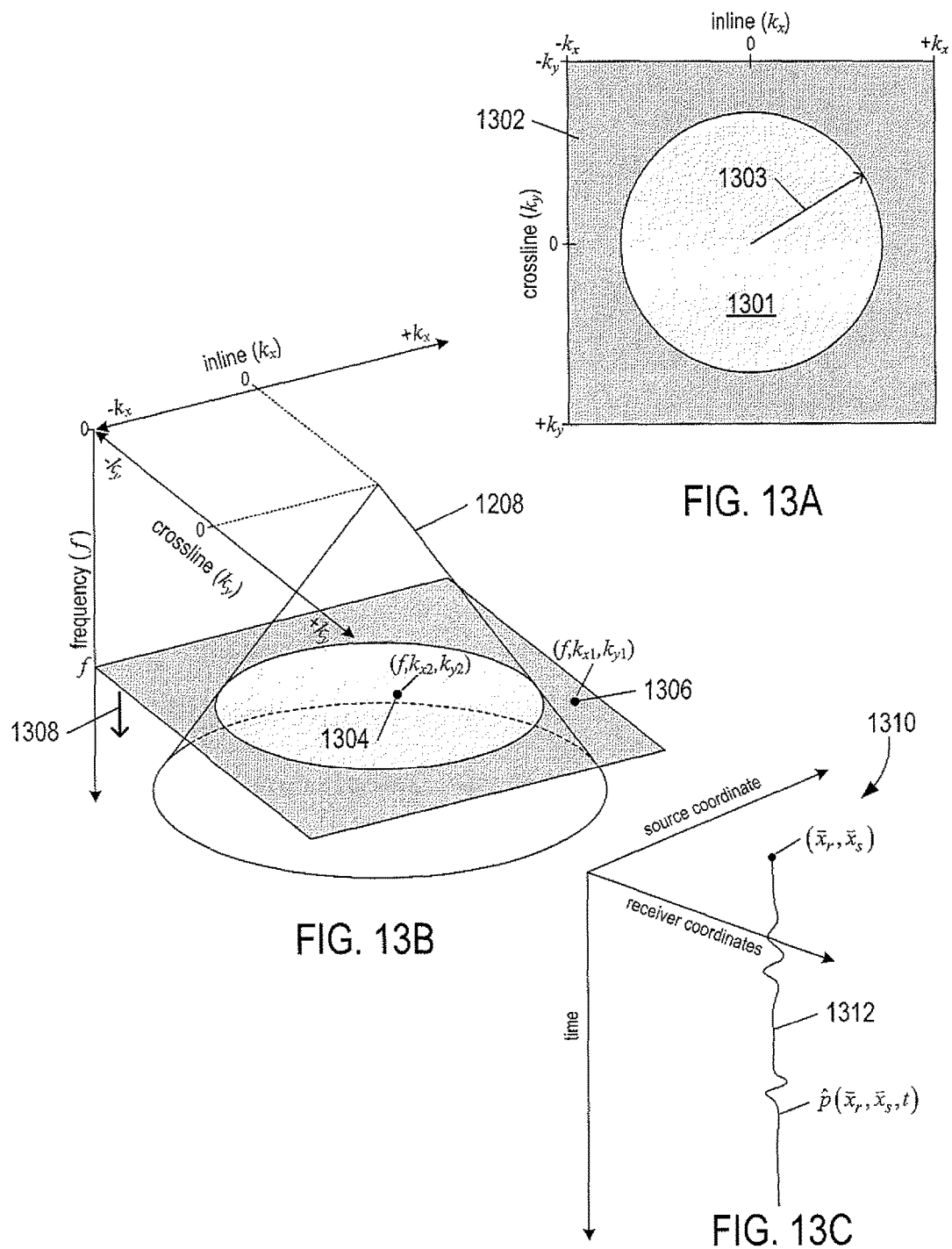
FIGS. 13A-13C show noise attenuation using a two-dimensional muting mask.

High speed noise in the seismic data may be attenuated by applying a 2D muting mask, such as the example w-f muting mask shown in FIG. 13A, for each frequency in the w-f domain. In FIG. 13A, the two-dimensional ("2D") muting mask contains a lightly shaded circular region 1301 surrounded by a darker shaded region 1302. The radius 1303 of the circular region is the speed of sound in water c. Points that lie within a plane defined by the 2D muting mask have the same frequency f but different in-line and cross-line wavenumbers. Points that lie within the circular region 1301 satisfy the condition given by Equation (11), and points that lie outside the circular region 1301 satisfy the condition in Equation (10). The 2D muting mask may be used to remove high speed noise from the seismic data by multiplying points in the w-f frequency domain that lie within the circular region 1301 by "1" and multiplying points in the w-f frequency domain that lie outside the circular region 1301 by "0." In other words, for each frequency f, if associated in-line and cross-line wavenumbers satisfy the condition $$\frac{f}{c} \leq \sqrt{k_x^2 + k_y^2} \quad (12)$$

the point is unchanged. On the other hand, for each frequency f, if associated in-line and cross-line wavenumbers satisfy the condition $$\sqrt{k_x^2 + k_y^2} < \frac{f}{c} \quad (13)$$

the point is muted.

FIG. 13B shows a snapshot of three-dimension filtering applied in the w-f domain using a 2D muting filter. Points 1304 and 1306 have the same frequency but different in-line and cross-line wavenumbers. The point 1304 satisfies Equation (12) and is retained, but the point 1306 satisfies Equation (13) and is muted. Muting in this manner is repeated for each frequency as indicated by directional arrow 1308, leaving noise attenuated seismic data that may still contain low speed noise.

The seismic data in the signal region 1208 may be transformed back to the s-t domain to obtain noise attenuated seismic data set 1310 shown in FIG. 13C. A trace 1312 corresponds to a trace 704 in the seismic data set 700 includes the signal component of the seismic data and any low speed noise that falls within the signal region 1208 as follows:

$$\hat{p}(\vec{x}_r, \vec{x}_s, t) = p_{des}(\vec{x}_r, \vec{x}_s, t) + n_{<c}(\vec{x}_r, \vec{x}_s, t) \quad (14)$$

Noise attenuation may be applied to two- and three-dimensional common-shot gathers or two- and three-dimensional common-receiver-station gathers and depends on the sampling in the in-line and cross-line directions.

Figure 14:
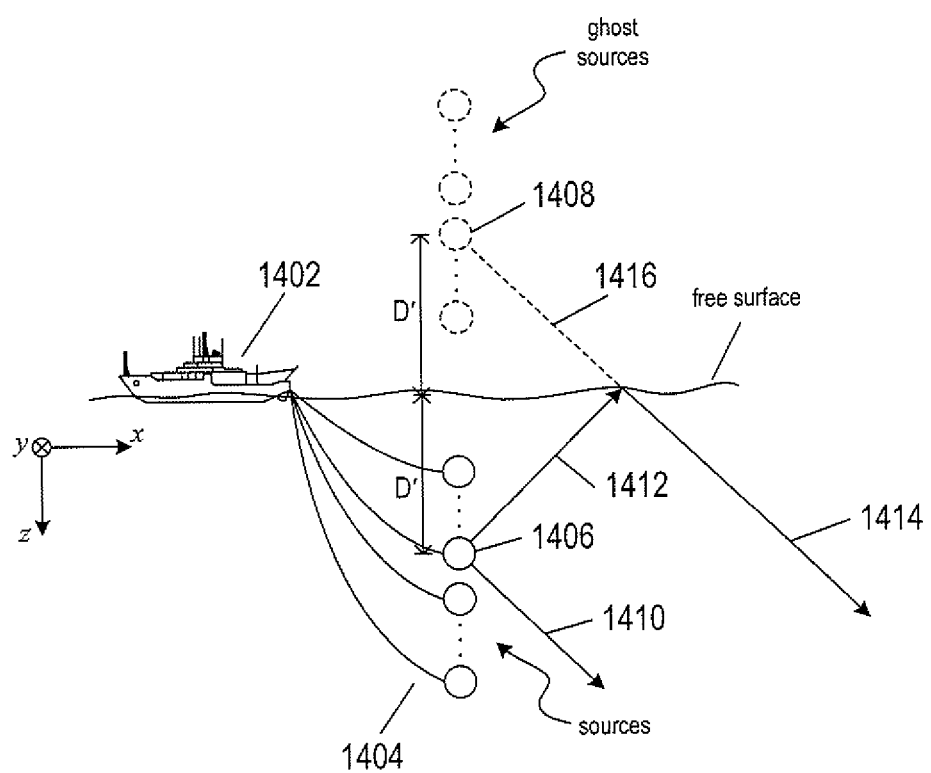
FIG. 14 shows a side-elevation view of a survey vessel that tows a vertical-source array beneath a free surface of a body of water.

Marine surveys carried out using a vertical-source array produce seismic data that may be source deghosted in the w-f domain. FIG. 14 shows a side elevation view of a survey vessel 1401 that tows a vertical-source array 1402 beneath the free surface of a body of water. Each source in the vertical-source array 1402 has a corresponding ghost source located substantially the same distance above the free surface. For example, the source 1406 in the vertical-source array 1404 is located at a depth D' below the free surface. The source 1406 has a corresponding ghost source located substantially the same distance D' above the free surface. When the source 1406 is activated, a source wavefield expands outward from the source 1406 in all directions. The free surface operates as a nearly perfect acoustic reflector by downwardly reflecting the portion of the source wavefield that propagates upward from the source 1406. The downward reflected portion of the source wavefield appears to have been generated by a virtual or ghost source located above the free surface and activated at approximately the same time as the corresponding source. For example, directional arrows 1410 and 1412 represent propagation directions of two different portions of the same source wavefield generated by the source 1406. The first portion propagates downward in the direction 1410. The second portion propagates upward in the direction 1412 and is reflected downward from the free surface in a direction represented by directional arrow 1414. The downwardly reflected source wavefield trails behind the downward source wavefield as if the downwardly reflected source wavefield had been generated by the ghost source 1408 located above the free surface, as indicated by a dashed-line extension 1416 of the directional arrow 1414.

The ghost sources effectively doubles the number of sources in the vertical-source array. For example, if a vertical-source array comprises ten sources, then the vertical-source array effectively operates as a vertical-source array comprising twenty sources. However, the ghost sources were not actually activated and the source wavefields that appear to have been generated by the ghost sources trail behind the source wavefields generated by the sources, which creates ghost effects or noise that adversely effects any resulting seismic images.

Figure 15:
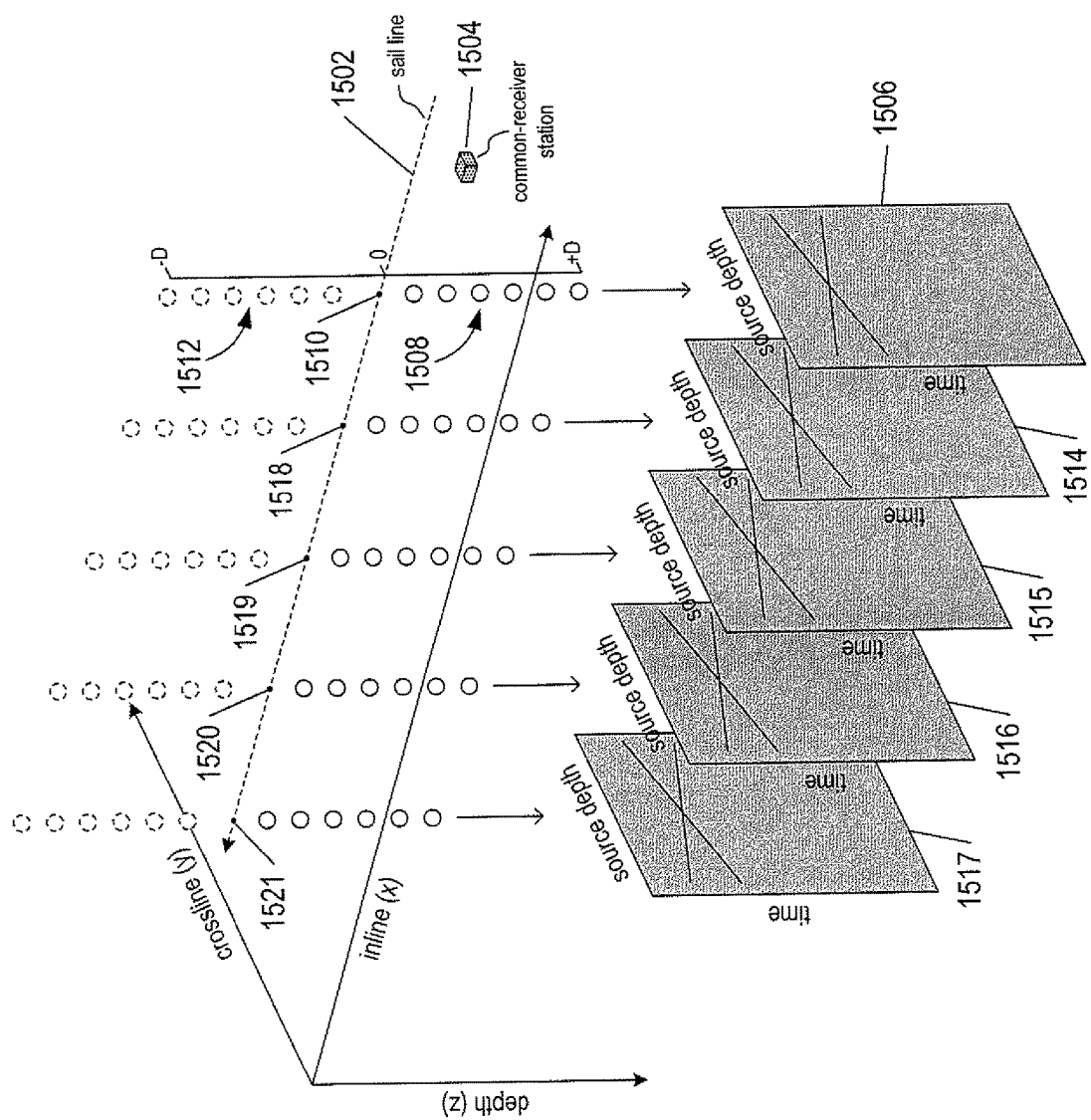
FIG. 15 shows a perspective view of a vertical-source array activated at five locations along a sail line.

Source deghosting may be performed on seismic data in a marine survey conducted with a vertical-source array by first sorting the seismic data into common-receiver-station gathers for each separate activation of the sources of the vertical-source array. FIG. 15 shows a side-elevation view of a vertical-source array comprising six sources activated at five different locations along a sail line 1502. The survey vessel that tows the vertical-source array is not shown. Box 1504 represents a common-receiver-station location in which source and reflected wavefields are measured by one or more receivers located at the common-receiver-station location for activations of the vertical-source array. Shaded rectangles represent common-receiver-station gathers formed for each separate activation of the sources of the vertical-source array along the sail line 1502. For example, common-receiver-station gather 1506 comprises traces generated by receivers that have common-receiver-station location 1504 when the six sources 1508 of the vertical-source array are activated at sail line location 1510 The common-receiver-station gather 1506 is a seismic data record of the source and reflected wavefields that result from activation of the sources 1508 of the vertical-source array and is a record of ghost source and ghost reflected wavefields associated with ghost sources 1512. Common-receiver-station gathers 1514-1517 of traces generated by receivers that are located at common-receiver-station location 1504 are formed for each separate activation of the vertical-source array at corresponding points 1518-1521 along the sail line. The common-receiver-station gathers 1506 and 1514-1517 are each two-dimensional gathers. The common-receiver-station gathers 1506 and 1514-1517 may be combined with the source coordinates 1510 and 1518-1521 to form a three-dimensional common-receiver-station gather as described above with reference to FIG. 9C.

FIGS. 16A-16E shows source deghosting a common-receiver-station gather 1602. FIG. 16A shows the common-receiver-station gather. Vertical axis 1604 represents time. Horizontal axis 1606 represents source depth with positive values corresponding to depths of sources of the vertical-source array and negative values corresponding to distances of ghost sources above the free surface. The traces with source depths in the interval [+D, 0] are associated with actual sources located below the free surface. By contrast, traces with source depths in the interval [0, −D] are associated with ghost sources. The traces with source depths in the interval [0, −D] may be obtained by copying each trace with source depths in the interval [+D, 0]. In the case of pressure data, the amplitudes in the trace may be multiplied by −1 in order to incorporate free surface reflectivity. Negative sloped line 1608 represents reflection events from a subterranean surface produced by source wavefields associated with sources of the vertical-source array. Positively sloped line 1610 represents reflection events from the subterranean surface produced by source wavefields associated with ghosts of the vertical-source array. The common-receiver-station gather is transformed from the s-t domain to the w-f domain shown in FIG. 16B. Vertical axis 1612 represents frequency. Horizontal axis 1614 represents wavenumbers in the z-direction. Shaded region 1618 represents a signal region that contains signal components of the seismic data in the common-receiver-station gather. Dashed-dot line 1620 divides the signal region into a first signal region 1622 and a second signal region 1624. The first signal region 1622 corresponds to negative z-direction wavenumbers and encompasses signal components associated with sources of the vertical-source array. The second signal region 1624 corresponds to positive z-direction wavenumbers and encompasses signal components associated with the ghost sources of the vertical-source array. In FIG. 16C, muting is applied to seismic data with corresponding z-direction wavenumbers greater than zero. After muting, the signal components in the first signal region 1622 remains, as shown in FIG. 16D. The seismic data remaining after muting is transformed from the w-f domain to the s-t to obtain a source-deghosted common-receiver-station gather shown in FIG. 16E. Notice that only the reflection events 1608 associated with the sources of the vertical-source array remain. The reflection events 1610 associated with the source ghosts have been removed.

Figures 17A, 17B:
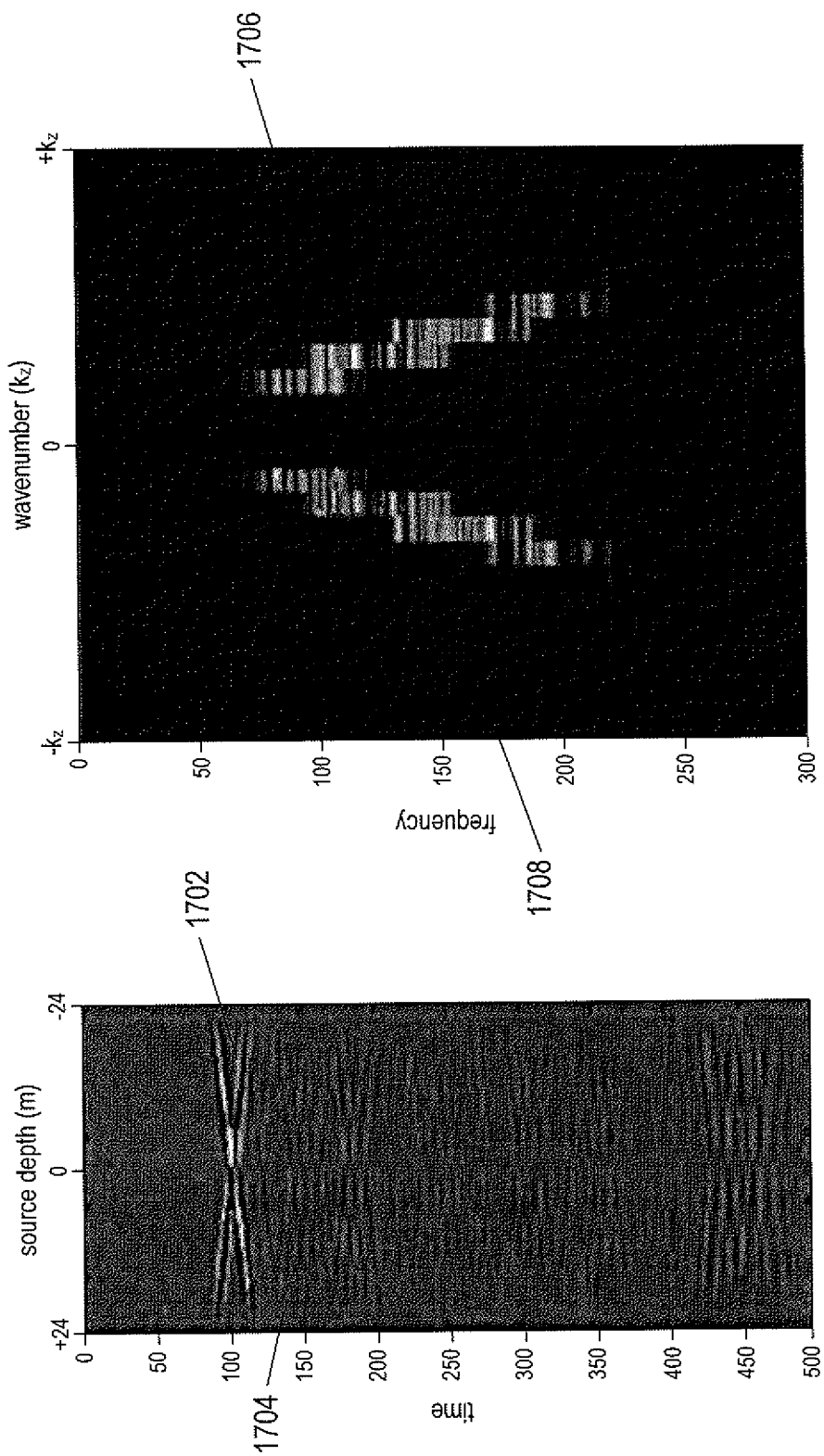
FIGS. 17A-17D show source deghosting applied to synthetic seismic data.
Figure 17D:
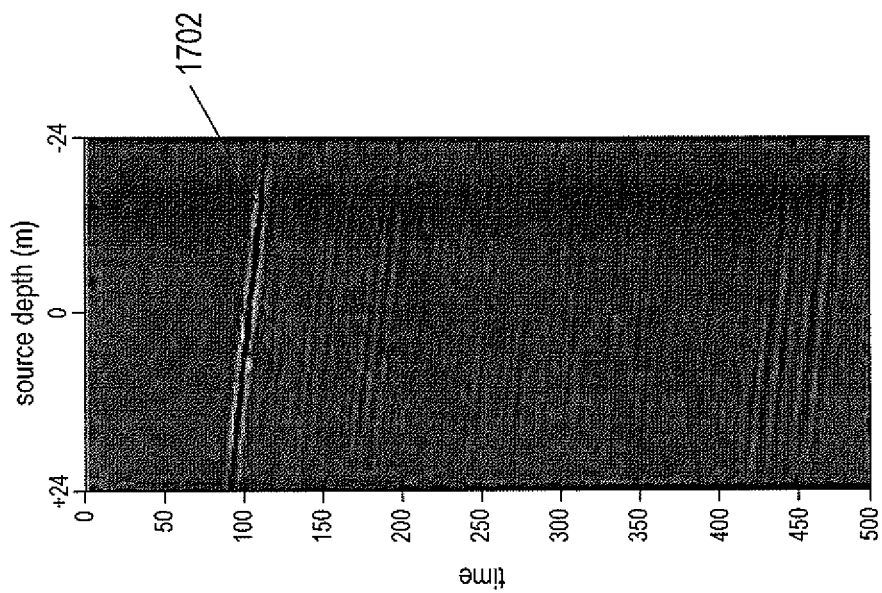
Figure 17C:
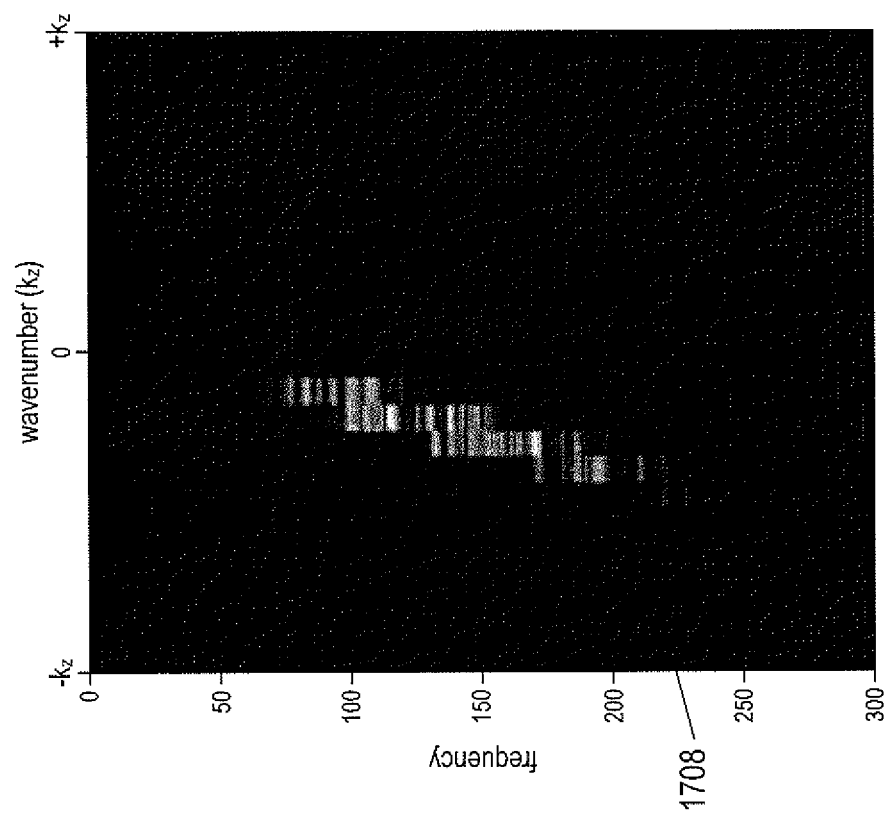

FIGS. 17A-17D show source deghosting applied to synthetic seismic data. FIG. 17A shows a synthetic common-receiver-station gather of seismic data generated by a vertical-source array, containing 12 real and 12 ghosts. The gather includes crossing reflection events 1702 and 1704. Negative slope reflection events 1702 result from source wavefields produced by sources of the vertical-source array. Positive slope reflection events 1704 result from source wavefields produced by ghosts of the vertical-source array. FIG. 17B shows the synthetic seismic data of the common-receiver-station gather in FIG. 17A transformed to the w-f domain. Shade regions 1706 and 1708 represents the reflection events 1702 and 1704, respectively, in the w-f domain. FIG. 17C shows the synthetic seismic data in the w-f domain after muting is applied to seismic data with z-direction wavenumbers greater than zero. FIG. 17D shows a source-deghosted common-receiver-station gather obtained by transforming the seismic data in FIG. 17C to the s-t domain. Notice that the reflection events 1704 associated with the ghosts of the vertical-source array have been removed.

Figure 18:
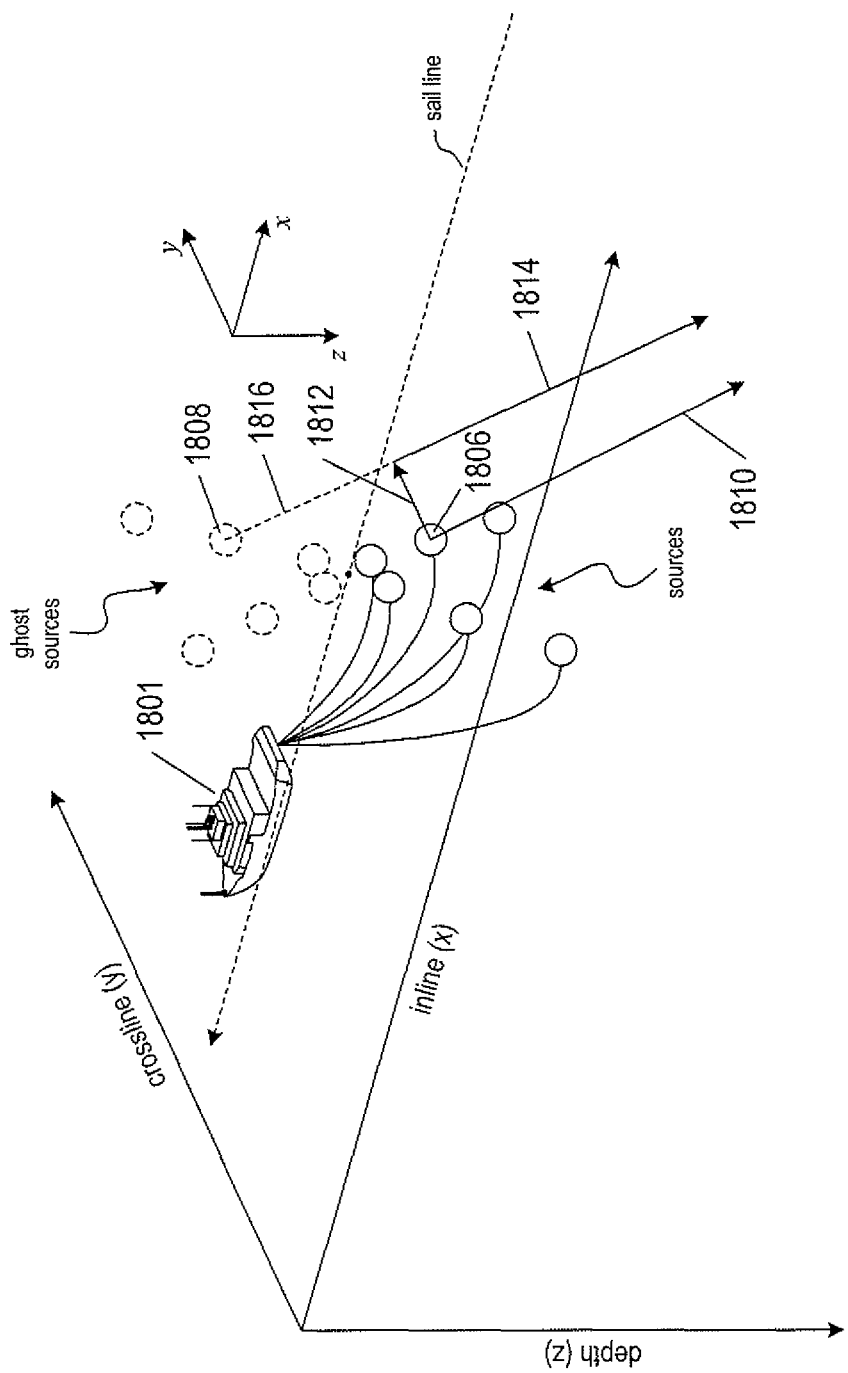
FIG. 18 shows a perspective view of a survey vessel that tows a bent-source array beneath a free surface of a body of water.

For marine surveys conducted with a bent-source array, source deghosting may also be carried out in the w-f domain as described above with reference to FIGS. 16 and 17. FIG. 18 shows a perspective view of a survey vessel 1801 that tows a bent-source array 1802 beneath the free surface of a body of water. Like with the vertical-source array, each source in the bent-source array 1802 has a corresponding ghost source located above the free surface. For example, when the source 1806 is activated, a source wavefield expands outward from the source 1806 in all directions. The portion of the source wavefield that is incident on the free surface is reflected downward as if the downward reflected portion of the source wavefield had been generated by a ghost source 1808 located above the free surface. Directional arrows 1810 and 1812 represent propagation directions of two different portions of the same source wavefield generated by the source 1806. The first portion propagates in the downward direction 1810. The second portion propagates in an upward direction 1812 and is downwardly reflected from the free surface in a direction represented by directional arrow 1814. The downwardly reflected source wavefield trails behind the downward source wavefield as if the downwardly reflected source wavefield had been generated by the ghost source 1808 located above the free surface, as indicated by a dashed-line extension 1816 of the directional arrow 1814.

The ghost sources effectively double the number of sources in the bent-source array. For example, the bent-source array 1802 comprises six sources. Reflections from free surface cause the bent-source array 1802 to effectively operate as a bent-source array with twelve sources. However, the ghost wavefields that appear to have been generated by the ghost sources trail behind the source wavefields generated by the actual sources, which creates ghost affects or noise that adversely effects any resulting seismic images.

Figure 19:
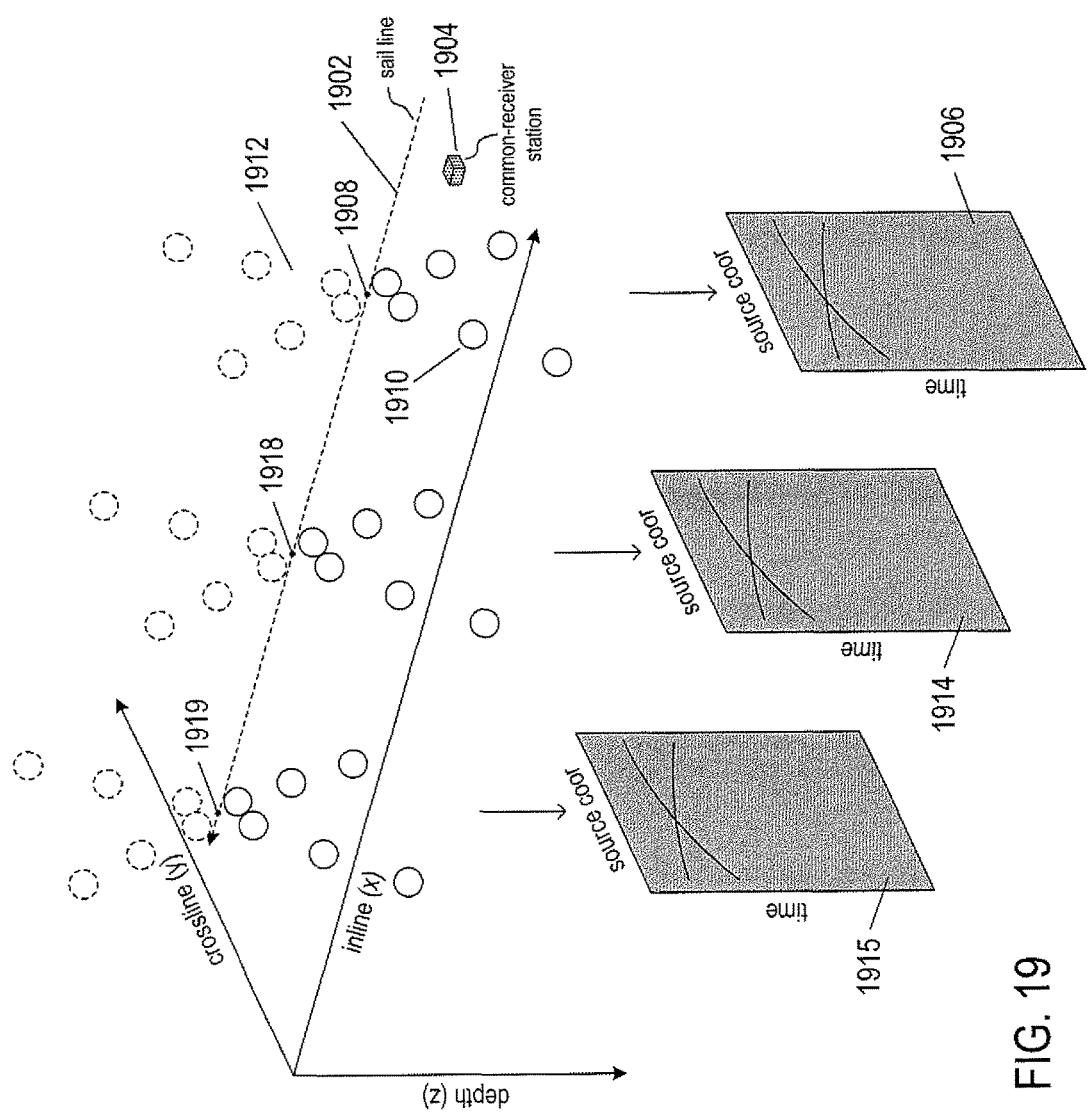
FIG. 19 shows a perspective view of a bent-source array activated at three locations along a sail line.

Source deghosting may be performed on seismic data produced for a survey conducted with a bent-source array in the same manner that source deghosting is described above with reference to FIG. 16. The seismic data for each activation of bent-source array 1802 is sorted into common-receiver-station gathers. FIG. 19 shows a perspective view of a bent-source array configured with six sources activated at three different locations along a sail line 1902. The survey vessel that tows the bent-source array is not shown. Box 1904 represents a common-receiver-station location in which source and reflected wavefields are measured by one or more receivers that are located at or pass over the common-receiver-station location for each activation of the bent-source array. Shaded rectangles represent common-receiver-station gathers formed for each activation of the bent-source array along the sail line 1902. For example, common-receiver-station gather 1906 comprises traces generated by one or more receivers located at common-receiver-station location 1904 when the bent-source array is activated at sail line location 1908. The common-receiver-station gather 1906 is a seismic data record of the source and reflected wavefields that result from activation of the sources 1910 of the bent-source array and is a record of ghost source and reflected wavefields associated with ghost sources 1912. Common-receiver-station gathers 1914 and 1915 include traces generated by one or more receivers that are located at or pass over the common-receiver-station location 1904 and are formed for each separate activation of the bent-source array at corresponding points 1918-1919 along the sail line. The common-receiver-station gathers 1906, 1914, and 1915 are two-dimensional gathers that may be combined with the source coordinates 1919, 1918, and 1919 to form a three-dimensional common-receiver-station gather.

Each of the common-receiver-station gathers formed for each activation of the bent-source array in FIG. 19 may be source deghosted in the same manner as the common-receiver-station gathers produced for each activation of the vertical-source array described above with reference to FIG. 16.

Figure 20A:
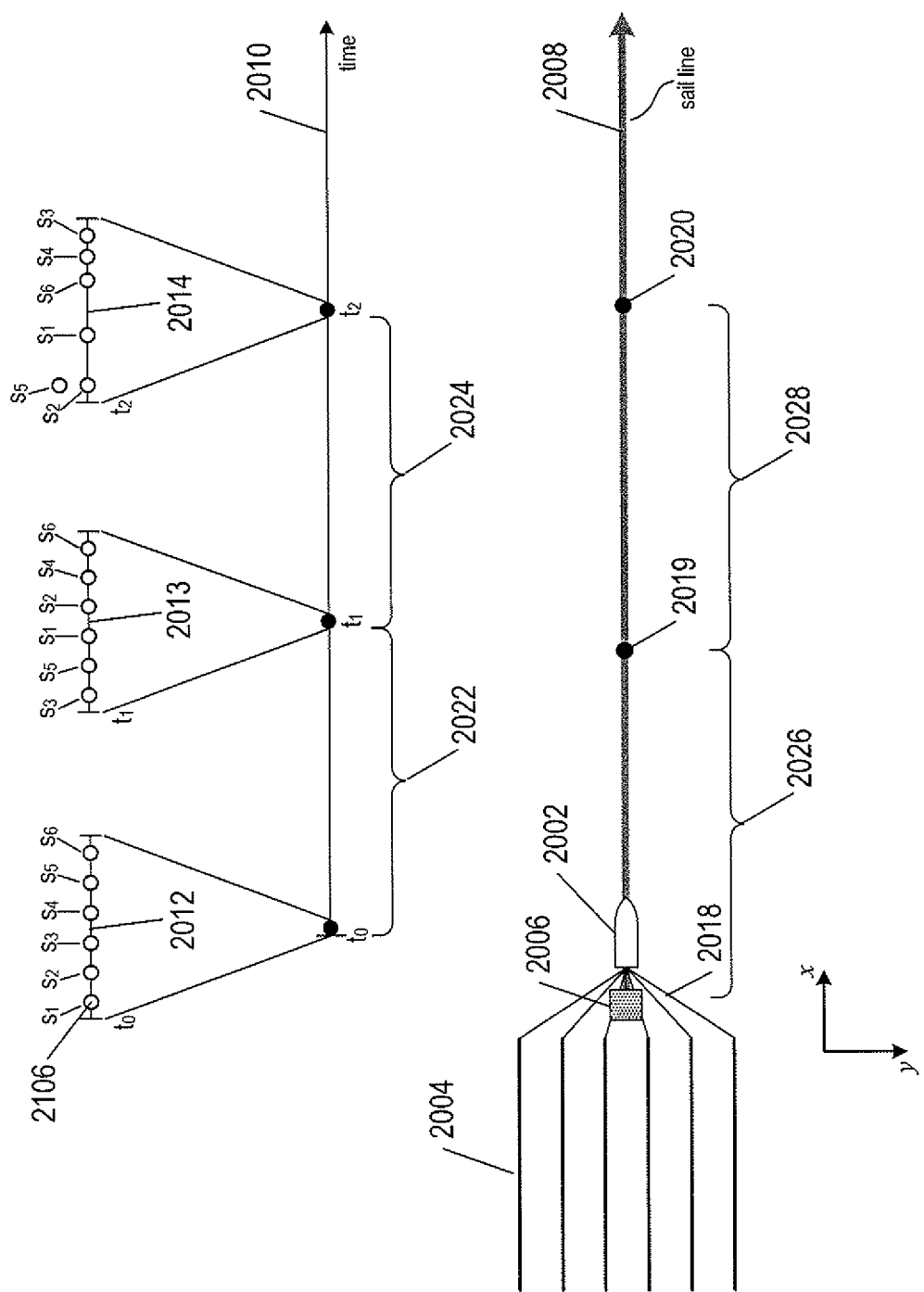
FIGS. 20A-20B show examples of recording blended seismic data as a survey vessel travels a sail line of a marine seismic survey.

In practice, the sources of a multiple source array may be activated to create blended seismic data. FIG. 20A shows an example of recording blended seismic data in separate shot records as a survey vessel travels a sail line of a marine seismic survey. In the example of FIG. 20A, a survey vessel 2002 tows six streamers 2004 and a multiple source array 2006 along a sail line 2008. The multiple source array 2006 may be a cross-line source array, a vertical-source array, a bent-source array, or another arrangement of sources. In other embodiments, more or fewer streamer may be used. FIG. 20 includes a time axis 2010 with start times of three activation-time intervals 2012-2014 denoted by $t_0$, $t_1$, and $t_2$. The sources of the multiple source array 2006 are activated within each activation-time interval. In the example of FIG. 20, the multiple source array 2006 comprises six sources denoted by $s_1$, $s_2$, $s_3$, $s_4$, $s_5$, and $s_6$. As the survey vessel 2002 travels the sail line 2008 at a substantially constant rate of speed, one or more of the sources of the multiple source array 2006 are activated within the activation-time intervals. For example, open circle 2016 represents a time when source $s_1$ is activated in the activation-time interval 2012. The sources may be activated in the same order in each activation-time interval. Alternatively, the order in which the sources are activated may be changed in different activation-time intervals. For example, the sources are activated in a different order in the activation-time intervals 2012 and 2014. Two or more of the sources may be activated at approximately the same time as represented in activation-time interval 2014, in which sources $s_2$ and $s_5$ are activated at approximately the same time. The sources may be activated at randomly selected times in each activation-time interval, or the sources may be activated according to a particular preselected order in each activation-time interval. The number of sources activated in an activation-time interval may be randomly selected. In FIG. 20A, the activation-time intervals 2012-2014 correspond to activation spatial intervals 2018-2020 along the sail line 2008. After each activation of one or more sources in the multiple source array 2006, pressure and/or particle motion wavefields are measured and seismic data recorded in shot records over longer duration recording time intervals, such as time intervals 2022 and 2024, which corresponds to recording spatial intervals 2026 and 2028, respectively. The beginning of each recording time interval may coincide with the start time of each activation-time interval. For example, recording time interval 2022 begins at $t_0$.

In alternative implementations, blended seismic data may be continuously recorded along a sail line and activation of sources of a multiple source array are not restricted to activation-time intervals. Activation of the sources may be separated by time intervals that are short enough that the source wavefields overlap and the continuously recorded seismic data is blended continuously recorded seismic data. The sources of a multiple source array may be activated according to a sequence or activated at random. The time intervals between activation of the sources of a multiple source array may be may be regular time intervals or random time intervals.

Figure 20B:
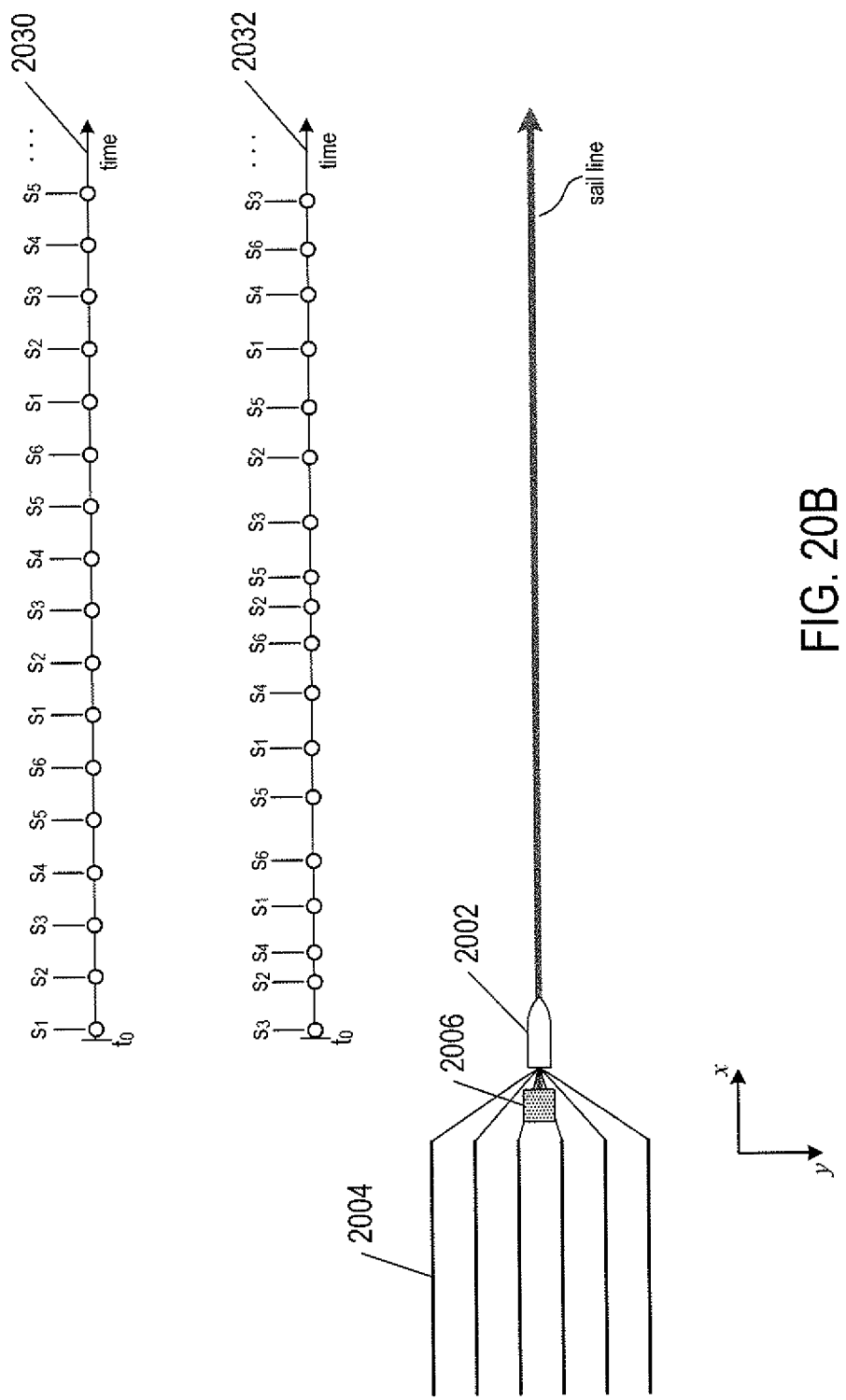

FIG. 20B shows examples in which activation of the sources of the multiple source array 2006 are separated by time intervals while blended seismic data is continuously recorded as the survey vessel travels the sail line 2008. Time axis 2030 shows one example in which the six sources $s_1$, $s_2$, $s_3$, $s_4$, $s_5$, and $s_6$ of the multiple source array 2006 are activated in a particular sequence separated by regularly spaced time intervals. Time axis 2032 shows an example in which the six sources $s_1$, $s_2$, $s_3$, $s_4$, $s_5$, and $s_6$ of the multiple source array 2006 are activated at random and at randomly spaced time intervals. In alternative implementations, the sources of a multiple source array may be activated in a sequential order but at randomly spaced time intervals. In still other implementations, the sources of a multiple source array may be activated at random and separated by regularly spaced time intervals.

The seismic data recorded in a recording time interval is blended seismic data when source and reflected wavefields created by activations of two or more sources of a multiple source array in the same source-activation-time interval overlap. In other words, a shot record that records overlapping source and reflected wavefields created by activations of two or more sources in the same source-activation-time interval comprises blended seismic data.

The difference between blended seismic data and unblended seismic data may be distinguished as follows. For unblended seismic data, the seismic data matrix P for a single frequency f in the seismic data set P described above with reference FIG. 8, may be represented by $$P = DXS \quad (15)$$

where

D is a receiver matrix;

X represents an impulse response matrix of the subterranean formation; and

S represents a source matrix.

The source matrix S is an N×N diagonal matrix in which each diagonal element is a far-field signature of one of the sources in the multiple source array having a source location $\vec{x}_s$. The far-field signatures may be determined by near-field pressure measurements of the source elements comprising each of the sources. The receiver matrix D is an M×M matrix in which each matrix element represents receiver sensitivity for each frequency and direction. The elements of D convert the seismic wavefield measured by a receiver at a receiver location $\vec{x}_r$ into a signal generated by the receiver. The impulse response matrix X is an M×N matrix in which each element represents how an impulse of the subterranean formation to a source wavefield generated by a source at the source location $\vec{x}_s$ and a signal generated at the receiver location $\vec{x}_r$. The seismic data matrix P at a frequency f is given by:

$$P(\vec{x}_r, \vec{x}_s, f) = \sum_{r=1}^{M} \sum_{s=1}^{N} d(\vec{x}_r) ir(\vec{x}_r, \vec{x}_s) ffs(\vec{x}_s) \quad (16)$$

where $d(\vec{x}_r)$ is a diagonal element of receiver matrix D;

$ir(\vec{x}_r, \vec{x}_s)$ is a matrix element of impulse response matrix X; and $ffs(\vec{x}_s)$ is a far-field signature of the source matrix S.

In practice, the unknown impulse response X is obtained from the seismic data matrix P by removing the source matrix S (i.e., designaturing) and the receiver matrix D.

On the other hand, with blended seismic data, traces in the seismic data set described above with reference to FIG. 7 represent blended source and receiver wavefields associated with different source activations. The seismic data set comprises traces of blended seismic data and is denoted by $\bar{p}_{bl}$. The blended seismic data set $\bar{p}_{bl}$ is transformed from the s-t domain to the s-f domain to obtain a blended seismic data set, $\bar{P}_{bl}$, in the s-f domain. Blending may be represented in the s-f domain by introducing a source blending matrix $\Gamma$ that transforms the source matrix S into a blended source matrix:

$$S_{bl} = S\Gamma \quad (17)$$

The source blending matrix $\Gamma$ models the physical interaction of overlapping source wavefields. Matrix elements of the blending matrix $\Gamma$ are represented by $$\gamma_{sj} = B_{sj} e^{-i\omega \Delta t_{sj}} \quad (18)$$

where s is a source index;

j is an activation-time interval index;

$B_{sj}$ is relative amplitude; and $\Delta t_{sj}$ is relative time delay with respect to a first source fired in the jth activation-time interval.

If the sth source is not activated in the jth activation-time interval, then the associated blending matrix element in Equation (18) is zero. On the other hand, if the sth source is the first source activated in the jth activation-time interval, then $\Delta t_{sj} = 0$ and the associated blending matrix element in Equation (18) is one. If the sth source is activated after a first source is activated in the jth activation-time interval, relative time delay $\Delta t_{sj}$ between activation of the first and the sth source is not zero in Equation (18). The blending matrix superimposes far-field signatures of specific sources in the multiple source array. The receiver matrix D is not affected when the sources are activated to create blended seismic data, and the impulse response matrix X is independent of the acquisition design. As a result, a blended seismic data matrix in the blended seismic data set $\bar{P}_{bl}$ for a particular frequency f is given by:

$$P_{bl} = DXS_{bl} = DXS\Gamma = P\Gamma \quad (19)$$

Before the source matrix S and the receiver matrix D can be removed from the blended seismic data matrix in Equation (19), the blending matrix $\Gamma$ is removed in a process called deblending. Because Equation (19) is typically underdetermined, the seismic data matrix P cannot be directly solved for by $P = P_{bl}\Gamma^{-1}$. Instead, deblending may be performed using an iterative process shown in FIGS. 21 and 22.

Figure 21:
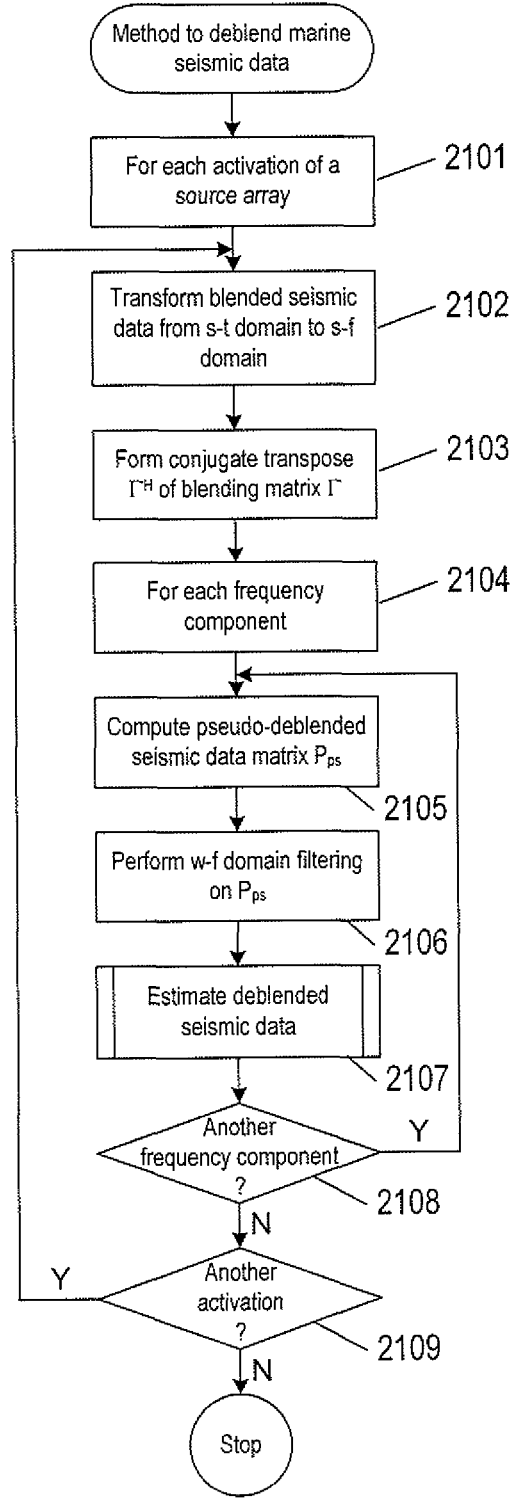
FIG. 21 shows a flow-control diagram of a method to deblend blended seismic data.

FIG. 21 shows an example flow-control diagram that implements a method to deblend blended seismic data. A loop beginning with block 2101 repeats the operations represented by blocks 2102-2111 for each activation of one or more sources of a multiple source array in source-array activation-time intervals, as described above with reference to FIG. 20. In block 2102, a blended seismic data set $\bar{p}_{bl}$ is transformed from the s-t domain to the s-f domain to obtain a blended seismic data set $\bar{P}_{bl}$. In block 2103, a blending matrix $\Gamma$ is formed from the recorded activation times of the sources activated in the source-array activation-time interval. A conjugate transpose of the blending matrix $\Gamma$ gives conjugate transposed blending matrix, $\Gamma^H$, where the superscription H represents conjugate transpose. A loop beginning with block 2104 repeats the operations represented by blocks 2105-2108 for each frequency of the blended seismic data set $\bar{P}_{bl}$. Each frequency of the blended seismic data set $\bar{P}_{bl}$ corresponds to a blended seismic data matrix $P_{bl}$, as described above with reference FIGS. 8 and 9. In block 2105, a pseudo-deblended seismic data matrix is computed as follows:

$$P_{ps} = P_{bl}\Gamma^H \quad (20)$$

In block 2106, the pseudo-deblended seismic data matrix $P_{ps}$ is transformed from the s-f domain to the w-f frequency domain as described above with reference to FIG. 12 and filtering is performed in the w-f domain to attenuate noise as described above with reference to FIG. 13A-13C. After filtering in the w-f domain, the filtered pseudo-deblended seismic data is transformed back to the s-f domain. In block 2107, a routine "estimate deblended seismic data" is called to calculate an estimated deblended seismic data matrix, $P_{deb}$, from the pseudo-deblended seismic data matrix $P_{ps}$. In decision block 2108, the operations represented by blocks 2105-2107 are repeated for a blended seismic data matrix associate with a different frequency of the blended seismic data set $\bar{P}_{bl}$. In decision block 2109, the operations represented by blocks 2102-2108 are repeated for another activation of the sources.

The deblended seismic data may be collected and used to calculate images of the subterranean formation. The images may reveal various structures and layers within the subterranean formation.

Figure 22:
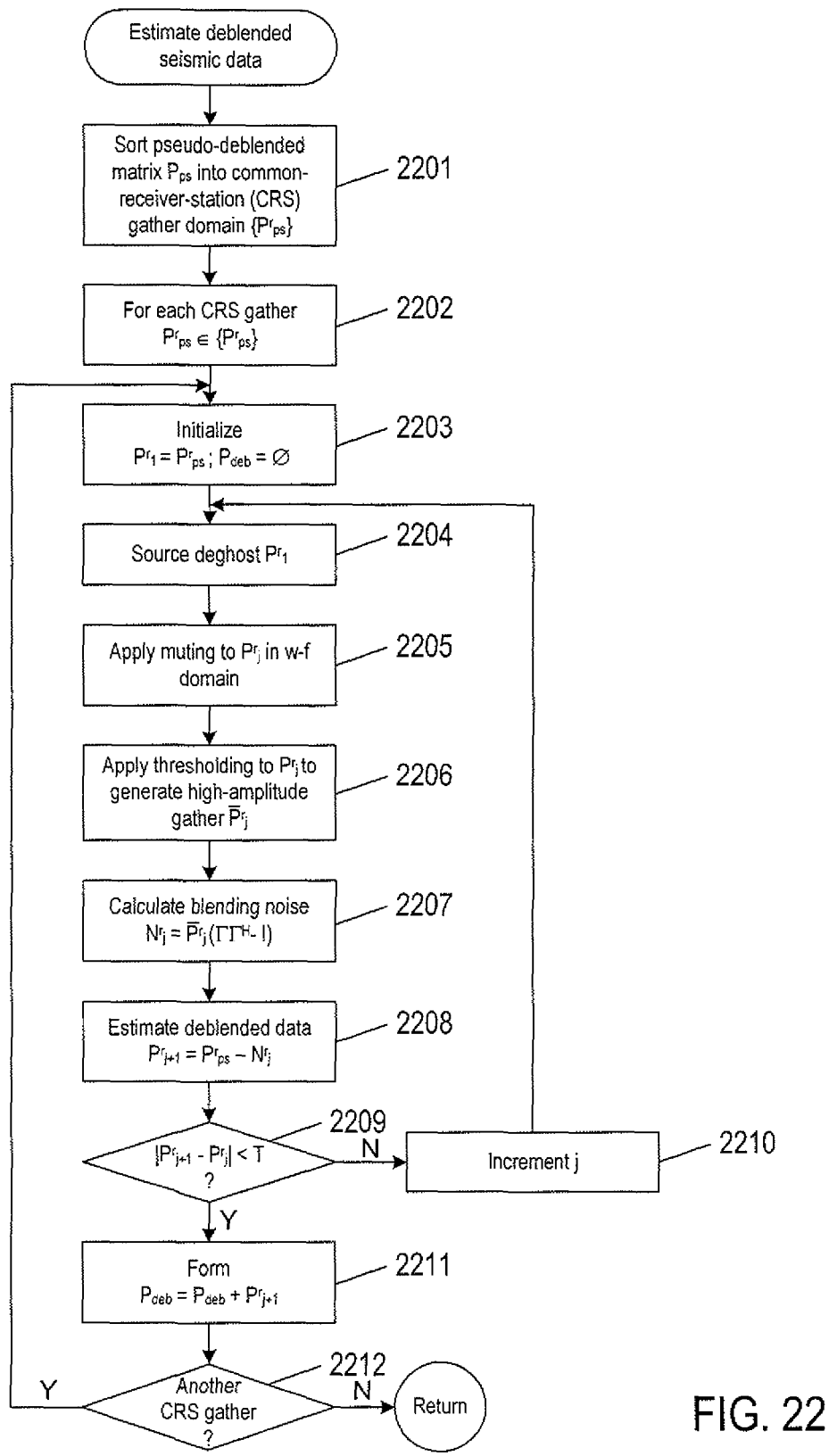
FIG. 22 shows a flow-control diagram of a routine "estimate deblended seismic data" called in FIG. 21.

FIG. 22 shows an example flow-control diagram that implements the routine "estimate deblended seismic data" called in block 2107 of FIG. 21. In block 2201, the pseudo-deblended seismic data matrix $P_{ps}$ is sorted into the common-receiver-station domain:

$$P_{ps} = \{P_{ps}^{pr}\}_{r=1}^{M} \quad (21)$$

where $P_{ps}^{r}$ represents a pseudo-deblended common-receiver-station gather of the pseudo-deblended seismic data matrix $P_{ps}$ for the rth receiver location.

A loop beginning with block 2202, repeats that operations of blocks 2203-2211 for each common-receiver-station gather $P_{ps}^{r}$ in the set $\{P_{ps}^{r}\}_{r=1}^{M}$. In block 2203, the pseudo-deblended common-receiver-station gather $P_{ps}^{r}$ is used to initialize a first estimated deblended common-receiver-station gather $P_{1}^{r}$, and an estimated deblended seismic data matrix $P_{deb}$ is initialized as the empty set. Blocks 2204-2209 represent an iterative process of determining an estimated deblended common-receiver-station gather from the pseudo-deblended common-receiver-station gather $P_{ps}^{r}$. In block 2204, the common-receiver-station gather $P_{1}^{r}$ is source deghosted as described above with reference to FIGS. 16-17. An estimated deblended common-receiver-station gather is denoted by $P_{j}^{r}$, where iteration j is an index. In block 2205, muting is applied in the w-f domain outside a frequency cone as described above with reference to FIGS. 16-17. In block 2206, thresholding is applied to the estimated deblended common-receiver-station gather $P_{j}^{r}$ by muting seismic data with amplitudes that are less than a threshold amplitude to generate a thresholded estimate of the deblended common-receiver-station gather $\bar{P}_{j}^{r}$. In block 2206, blending noise is calculated from the noise-free deblended common-receiver-station gather, blending matrix, and the conjugate transposed blending matrix as follows:

$$N_{j}^{r} = \bar{P}_{j}^{r}(\Gamma\Gamma^{H} - I) \quad (22)$$

where I represents the identify matrix.

In block 2208, a j+1$^{st}$ estimated deblended common-receiver-station gather $P_{j+1}^{r}$ is calculated as follows:

$$P_{j+1}^{r} = P_{ps}^{r} - N_{j}^{r} \quad (23)$$

In decision block 2209, when the following condition is satisfied for a threshold T $$|P_{j+1}^{r} - P_{j}^{r}| < T \quad (24)$$

the iterative process represented by blocks 2205-2208 is considered to have converged at the j+1$^{st}$ estimated deblended common-receiver-station gather $P_{j+1}^{r}$. Otherwise, control flows to block 2210 in which the index j is incremented and the computational operations represented by blocks 2204-2208 are repeated.

In block 2211, the j+1$^{st}$ estimated deblended common-receiver-station gather $P_{j+1}^{r}$ is added to the estimated deblended seismic data matrix $P_{deb}$:

$$P_{deb} = P_{deb} + P_{j+1}^{r} \quad (25)$$

In other words, in block 2211, the estimated deblended common-receiver-station gathers that satisfy the condition given by Equation (24) are collected to form an estimated deblended seismic data matrix $P_{deb}$ for the activation of the multiple source array. In decision block 2012, the operations represented by blocks 2203-2211 are repeated for another pseudo-deblended common-receiver-station gather. In an alternative implementation, rather than repeating the operations represented by blocks 2204-2209 until the estimated deblended common-receiver-station gathers converge, the operations represented by blocks 2204-2208 may be repeated for a fixed number iterations.

Figures 23A, 23B, 23C:
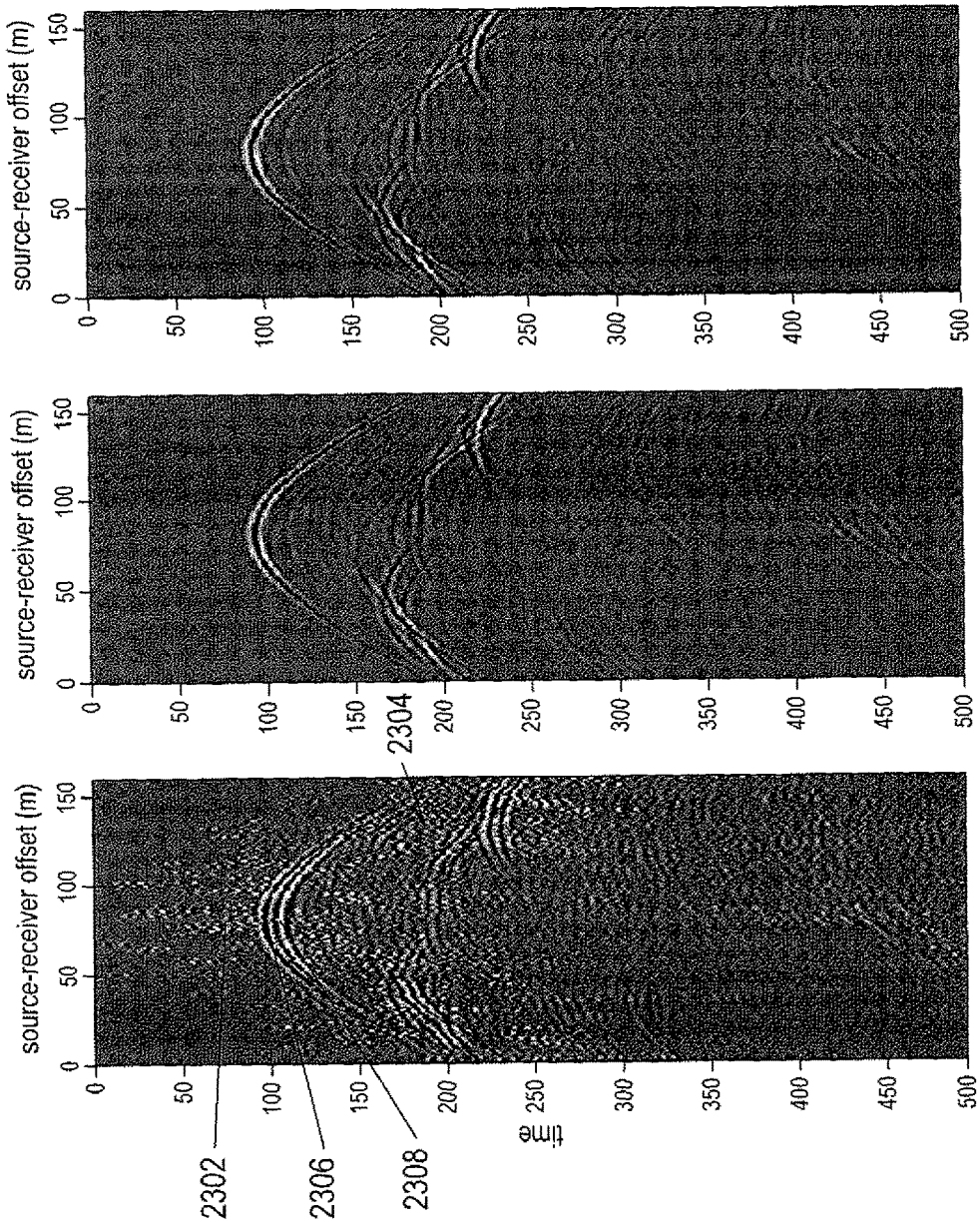
FIGS. 23A-23C show source deblending applied to a common-shot gather of pseudo-deblended seismic data produced with a source of a vertical-source array.

FIGS. 23A-23C show source deblending applied to a common-receiver-station gather of pseudo-deblended seismic data produced with a source of a vertical-source array. FIG. 23A shows pseudo-deblended seismic data generated by a source located 28.125 m below the free surface and its corresponding ghost source. Speckled regions 2302 and 2304 represent reflection events produced by another source in the vertical-source array. The seismic data shows reflection events that correspond to the actual source, such as event 2306. The seismic data also shows reflection events that are recorded later in time and correspond to the ghost source, such as event 2308. FIG. 23B shows the results of deblending and source deghosting described above to remove reflection events associated with the other source and the source ghost. FIG. 23C shows a common-receiver-station gather of unblended data for a single source activated at the depth of 28.125 meters below the free surface. Comparison of the gathers in FIGS. 23B and 23C reveals the effectiveness of deblending and source deghosting methods described above.

Figure 24A:
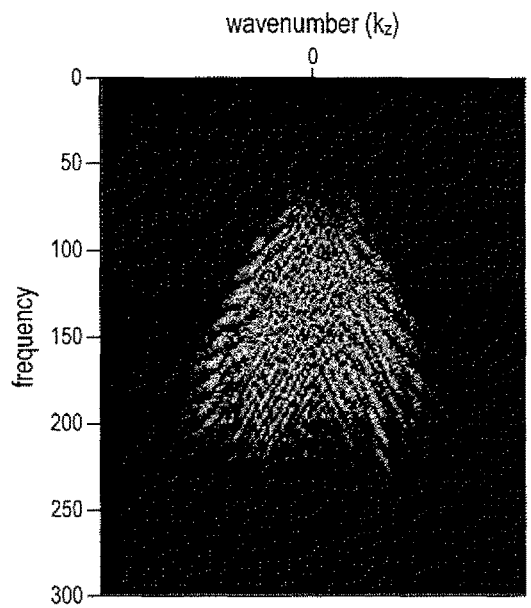
FIGS. 24A-24D show deblended and unblended seismic data and difference between deblended and unblended seismic data shown in FIG. 23A-23C.
Figure 24B:
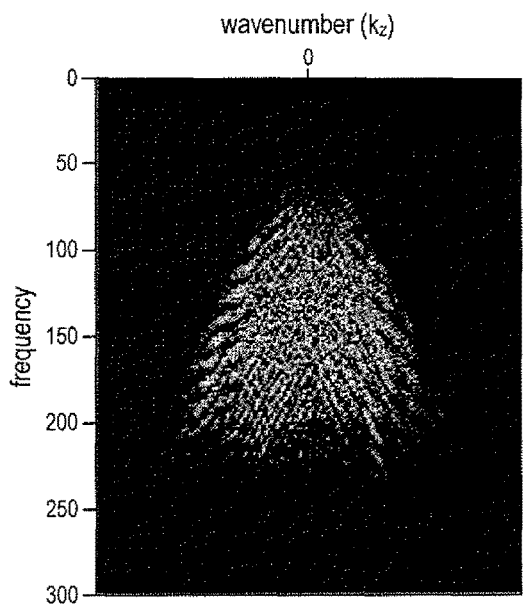
Figure 24C:
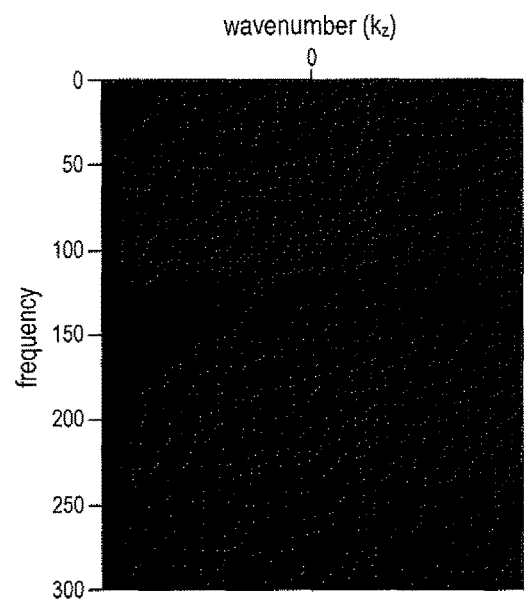
Figure 24D:
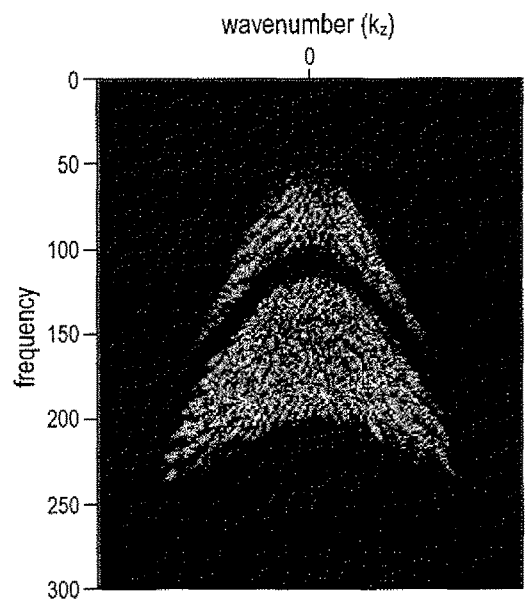

FIGS. 24A and 24B show the deblended and unblended seismic data shown in FIGS. 23B and 23C transformed into the w-f domain. The black region in each figure represents a zero value. FIG. 24C shows the error between the transformed deblended and unblended seismic data calculated as the difference between the results shown in FIGS. 24A and 24B. Very few non-zero points are present near the center of FIG. 24C, which indicates deblended and unblended seismic data shown in FIGS. 23B and 23C are in close agreement. FIG. 24D shows seismic data in the w-f domain for a source at a depth of 28.125 m and the corresponding source ghost.

Deblending results, such as those shown in FIGS. 23 and 24, may be improved by decreasing the strength (i.e., amplitude) of the source wavefields with distance from the center of the multiple source array. In particular, transformations, such as the Fourier transformation, are improved over a source axis of seismic data as the strength of the source wavefields generated by sources located farther from the center of the multiple source array are decreased. In order to decrease the strength or amplitude of the source wavefields with distance from the center of a multiple source array, the sources of the multiple source array may be activated such that the farther a source is from the center of the multiple source array, the fewer number of the source elements of the source are activated. Alternatively, sources located near the center of the multiple source array may be implemented with more source elements and/or with source elements having larger chamber volumes than source elements of sources located farther away from the center of the multiple source array.

Figure 25:
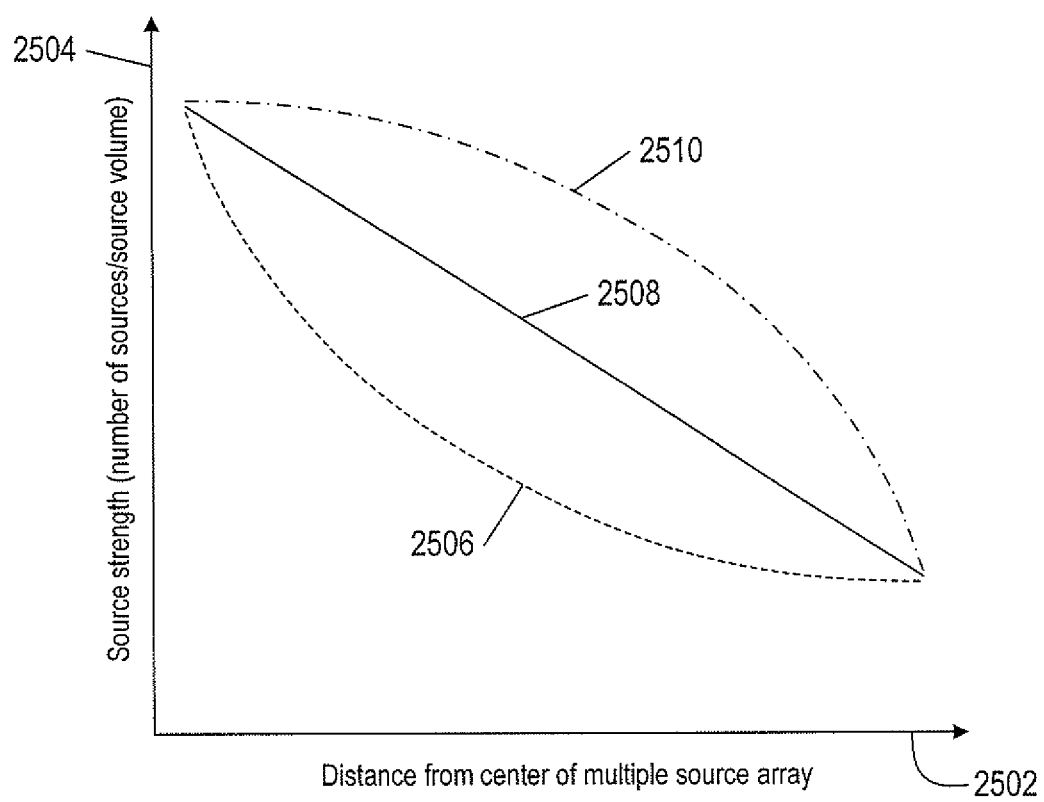
FIG. 25 shows example plots of source strength in a multiple source array with increasing distance from a center of the multiple source array.

FIG. 25 shows example plots of source strength (i.e., amplitude) of sources in a multiple source array that decrease with increasing distance from a center of the multiple source array. Horizontal axis 2502 represents distance from the center of the multiple source array. Vertical axis 2504 represents source strength (i.e., amplitude). Curve 2506 represents source strength that exponentially decreases from the center of a multiple source array. Curve 2508 represents source strength that linearly decreases from the center of a multiple source array. Curve 2510 represents source strength that parabolically decreases from the center of a multiple source array. Curves 2506, 2508, and 2510 represent examples of ways in which the strength of the source wavefields generated by sources of a multiple source array may decrease as the distance of the sources increase from the center of the multiple source array.

Figure 26:
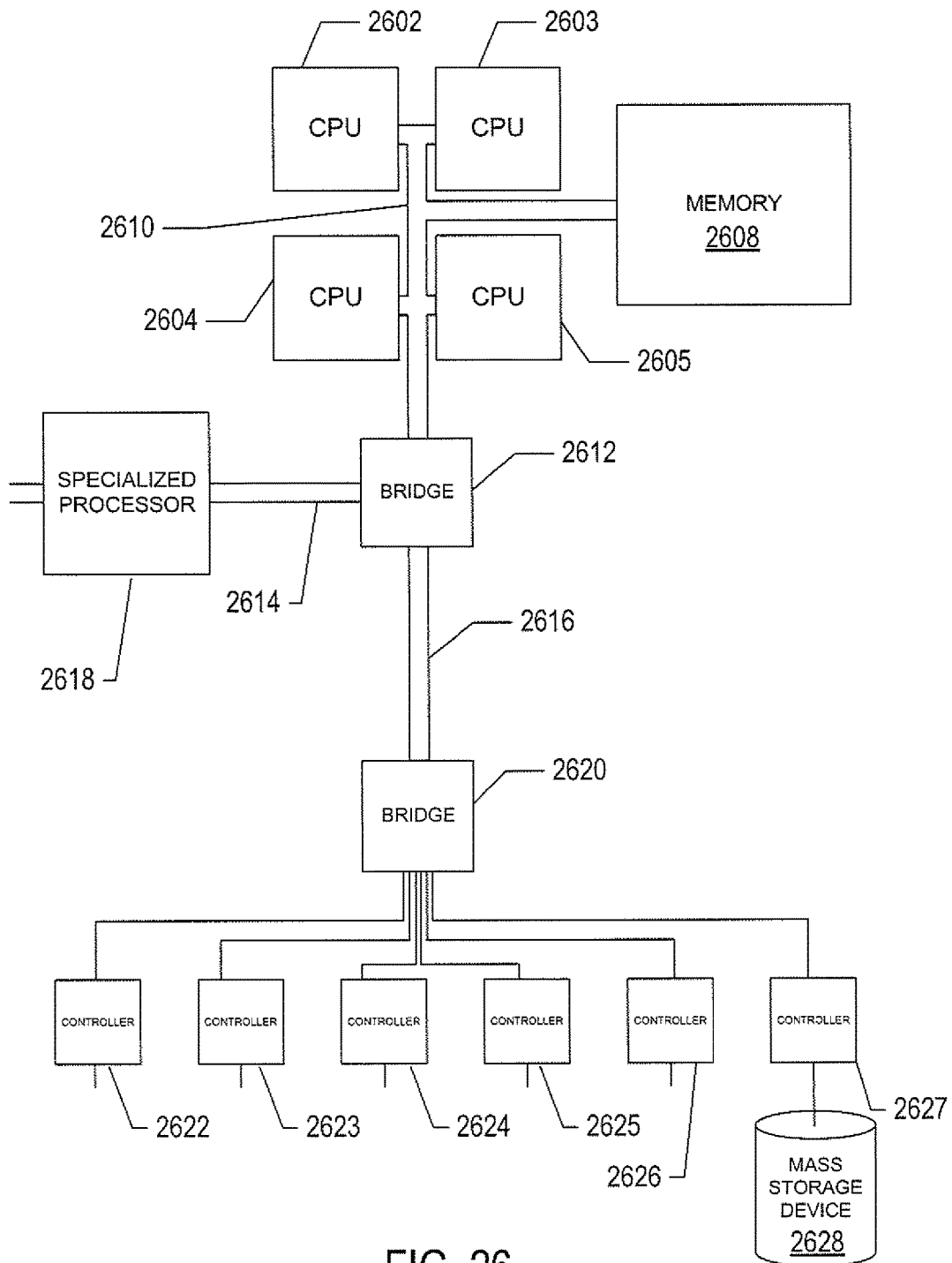
FIG. 26 shows an example of a computer system that may be used to execute efficient methods of attenuating noise, source deghosting, and deblending seismic data according to embodiments disclosed herein.

FIG. 26 shows an example computer system that executes efficient methods of attenuating noise, source deghosting, and deblending seismic data and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2602-2605, one or more electronic memories 2608 interconnected with the CPUs by a CPU/memory-subsystem bus 2610 or multiple busses, a first bridge 2612 that interconnects the CPU/memory-subsystem bus 2610 with additional busses 2614 and 2616, or other types of high-speed interconnection media, including multiple, high-speed serial interconnects. The busses or serial interconnections, in turn, connect the CPUs and memory with specialized processors, such as a graphics processor 2618, and with one or more additional bridges 2620, which are interconnected with high-speed serial links or with multiple controllers 2622-2627, such as controller 2627, that provide access to various different types of non-transitory computer-readable media, such as computer-readable medium 2628, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2628 is a data-storage device, including electronic memory, optical or magnetic disk drive, USB drive, flash memory and other such data-storage device. The computer-readable medium 2628 can be used to store machine-readable instructions that encode the computational methods described above and can be used to store encoded data, during store operations, and from which encoded data can be retrieved, during read operations, by computer systems, data-storage systems, and peripheral devices.

The methods and systems described above produce seismic data generated using multiple source arrays. The seismic data may be deblended, source deghosted, and undergo noise attenuation as described above. The resulting seismic data may then be further processed to obtain accurate, high-resolution seismic images of subterranean formations located beneath a body of water. High-resolution seismic images of a subterranean formation may, in turn, be used to determine the structure of a subterranean formation. The structural information may reveal petroleum reservoirs and may be used to monitor petroleum reservoirs during production.

The methods and systems disclosed herein may be use to form or process a geophysical data product indicative of certain properties of a subterranean formation. The geophysical data product may include geophysical data such as pressure data, particle motion data, particle velocity data, particle acceleration data, and any seismic image that results from using the methods and systems described above. The geophysical data product may be stored on a non-transitory computer-readable medium as described above. The geophysical data product may be produced offshore (i.e., by equipment on the survey vessel 102) or onshore (i.e., at a computing facility on land).

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but will be accorded the widest scope consistent with the principles and novel features disclosed herein.

The invention claimed is:

1. A method of collecting seismic data in a marine survey, the method comprising:
   towing a cross-line source array by a survey vessel, the cross-line source array having three or more sources in a linear arrangement, wherein a total length of the cross-line source array in the cross-line direction is less than a separation distance between any two adjacent streamers towed by the survey vessel, and a separation distance between adjacent sources in the cross-line direction is about the distance between adjacent streamers divided by the number of sources in the cross-line source array;
   activating the three or more sources of the cross-line source array, each source producing a source wavefield; and
   recording seismic data generated by receivers located along the streamers in a non-transitory computer-readable medium, each receiver measuring source wavefields created by the cross-line source array and reflected wavefields generated by a subterranean formation in response to the source wavefields.

2. The method of claim 1, wherein activating the sources of the cross-line source array comprises activating each of the sources at randomly selected times in an activation time interval such that the source wavefields overlap, the reflected wavefields overlap, and the seismic data is blended seismic data.

3. The method of claim 1, wherein activating the sources of the cross-line source array comprises activating the sources according to a sequence in an activation time interval such that the source wavefields overlap, the reflected wavefields overlap, and the seismic data is blended seismic data.

4. The method of claim 1, wherein an amplitude of each source wavefield decreases with increasing distance from a center of the cross-line source array.

5. The method of claim 1, wherein activating sources of the cross-line source array comprises activating fewer source elements per source of the cross-line source array with increasing distance from a center of the cross-line source array.

6. The method of claim 1, comprising calculating cross-line particle velocities at the receiver locations from the seismic data.

7. The method of claim 6, wherein the seismic data includes pressure data and calculating the cross-line particle velocity comprises:
   calculating an approximate cross-line particle velocity at a point between two locations of two sources of the cross-line source array from the pressure data generated by a pressure sensor at the receiver location for activation of a first of the two sources and pressure data generated by the pressure sensor at the receiver location for activation of a second of the two sources;

applying source location reciprocity to the approximate cross-line particle motion velocity at the point between the two sources to generate an approximate cross-line particle velocity at the receiver location.

8. The method of claim 7, wherein calculating the approximate cross-line particle motion velocity at the point between the two sources further comprises:

transforming the pressure data recorded for activation of the two sources from the space-time domain to the space-frequency domain;

calculating a pressure gradient at the point between the two sources from the pressure data associated with activation of the first of the two sources and the pressure data associated with activation of the second of the two sources; and multiplying the pressure gradient by the cross-line particle displacement direction to generate a pressure gradient in the cross-line direction;

dividing the pressure gradient in the cross-line direction by a product of an angular frequency and speed of sound in water; and applying source location reciprocity to the pressure gradient in the cross-line direction to generate the approximate cross-line particle motion velocity at the receiver location.

9. The method of claim 6, further comprising interpolating cross-line particle velocities between receivers of adjacent streamers to reduce cross-line spatial aliasing based on the approximate cross-line particle velocity at the receiver locations.

10. A system to collect seismic data generated with a cross-line source array, the system comprising:

a cross-line source array having three of more linearly arranged sources in the cross-line direction, each source having a number of source elements, wherein a total length of the cross-line source array in the cross-line direction is less than a separation distance between any two adjacent streamers towed by the survey vessel, and a separation distance between adjacent sources in the cross-line direction is about the distance between adjacent streamers divided by the number of sources in the cross-line source array;

a seismic source control that controls activation of the sources, each source produces a source wavefield; and recording equipment that records seismic data generated by one or more receivers that measure source wavefields created by the cross-line source array and reflected wavefields generated by a subterranean formation in response to the source wavefields.

11. The system of claim 10, wherein number of source elements per source of the cross-line source array decreases with increasing distance from a center of the cross-line source array.

12. The system of claim 10, wherein chamber volumes of source elements per source of the cross-line source array decreases with increasing distance from a center of the cross-line source array.

13. A method of manufacturing a geophysical data product, the method comprising:

towing a cross-line source array by a survey vessel, the cross-line source array having three or more sources in a linear arrangement, wherein a total length of the cross-line source array in the cross-line direction is less than a separation distance between any two adjacent streamers towed by the survey vessel, and a separation distance between adjacent sources in the cross-line direction is about the distance between adjacent streamers divided by the number of sources in the cross-line source array;

activating the three or more sources of the cross-line source array, each source producing a source wavefield; and recording seismic data generated by receivers located along streamers in a non-transitory computer-readable medium, each receiver measuring source wavefields created by the cross-line source array and reflected wavefields generated by a subterranean formation in response to the source wavefields.

* * * * *